(12) United States Patent
Aoyama et al.

(10) Patent No.: US 6,535,651 B1
(45) Date of Patent: Mar. 18, 2003

(54) INTERPOLATING OPERATION METHOD AND APPARATUS FOR IMAGE SIGNALS

(75) Inventors: Tatsuya Aoyama, Kanagawa-ken (JP); Wataru Ito, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 08/829,471

(22) Filed: Mar. 28, 1997

(30) Foreign Application Priority Data

| Mar. 28, 1996 | (JP) | 8-074657 |
|---|---|---|
| Jun. 26, 1996 | (JP) | 8-166272 |

(51) Int. Cl.⁷ ................................................. G06K 9/32
(52) U.S. Cl. ...................... 382/300; 382/199; 382/203; 382/266; 382/274
(58) Field of Search ................................ 382/300, 199, 382/203, 266, 274; 364/723

(56) References Cited

U.S. PATENT DOCUMENTS

| 4,729,098 | A | * | 3/1988 | Cline et al. | 345/421 |
| 4,876,509 | A | * | 10/1989 | Perlmutter | 324/309 |
| 5,048,105 | A | * | 9/1991 | Adachi | 382/300 |
| 5,054,100 | A | * | 10/1991 | Tai | 382/300 |
| 5,327,257 | A | * | 7/1994 | Hrytak et al. | 358/447 |
| 5,418,899 | A | * | 5/1995 | Aoki et al. | 345/439 |
| 5,726,766 | A | * | 3/1998 | Saotome | 358/428 |
| 5,732,107 | A | * | 3/1998 | Phillips et al. | 375/296 |
| 5,737,101 | A | * | 4/1998 | Ito | 358/525 |
| 5,754,710 | A | * | 5/1998 | Sekine et al. | 382/300 |
| 5,774,601 | A | * | 6/1998 | Mahmoodi | 382/298 |

FOREIGN PATENT DOCUMENTS

| EP | 0 753 828 A2 | 1/1997 | G06T/3/40 |
| EP | 0753828 | * 1/1997 | G06T/3/40 |

OTHER PUBLICATIONS

"Deriving Shape Functions for Traingular miid–edge finite elements through blending–function interpolation", K. Ho–lee, 8340 Computer–Aided Design, No. 9, London GB, pp 55–60, Nov. 1989.*
Patent Abstracts of Japan, vol. 018, No. 073 (E–1503) Feb. 7, 1994, & JP 05–284526 A (Sony Corp) Oct. 29, 1993.*

* cited by examiner

Primary Examiner—Bhavesh Mehta
Assistant Examiner—Gregory Desiré
(74) Attorney, Agent, or Firm—Sughrue Mion, PLLC

(57) ABSTRACT

An original image signal, which represents an original image and are composed of original image signal components representing a plurality of sampling points, that are arrayed at predetermined intervals and in a lattice-like form, is obtained. A judgment is made as to whether an interpolation point belongs to an image edge portion, at which the change in the original image signal is sharp, or belongs to a flat portion, at which the change in the original image signal is unsharp. Interpolating operation processes, one of which is to be employed for the interpolation point, is changed over to each other in accordance with the results of the judgment. Interpolated image signal components corresponding to interpolation points are thereby obtained from the interpolating operation processes such that a visible image, in which a character pattern and an image edge portion are free from any step-like pattern and are sharp and a flat portion has an appropriate level of sharpness, can be reproduced from the interpolated image signal components.

26 Claims, 13 Drawing Sheets

FIG. 3
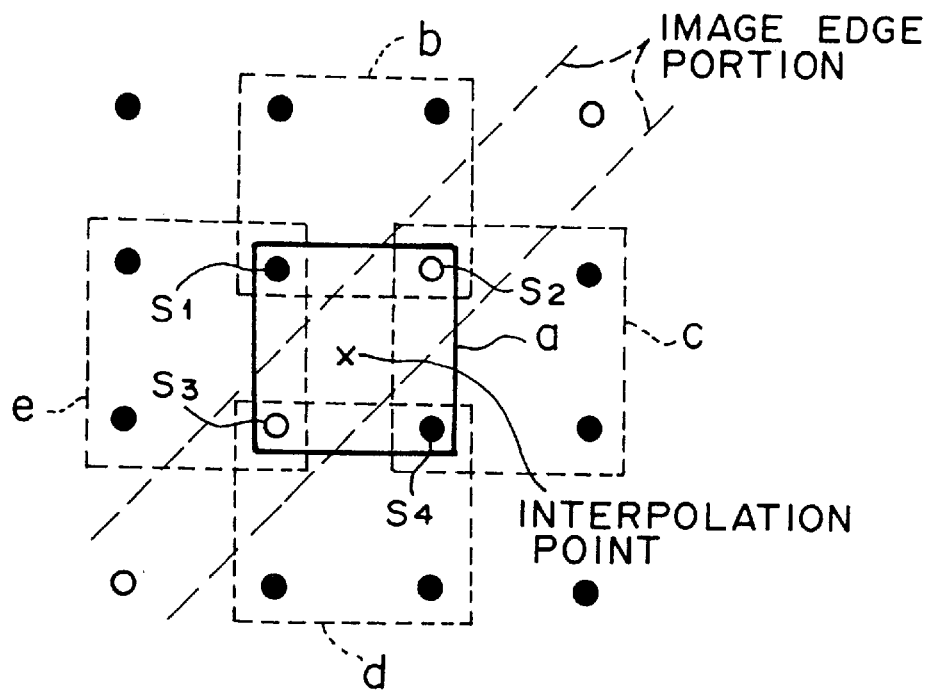
FIG. 4A
FIG. 4B
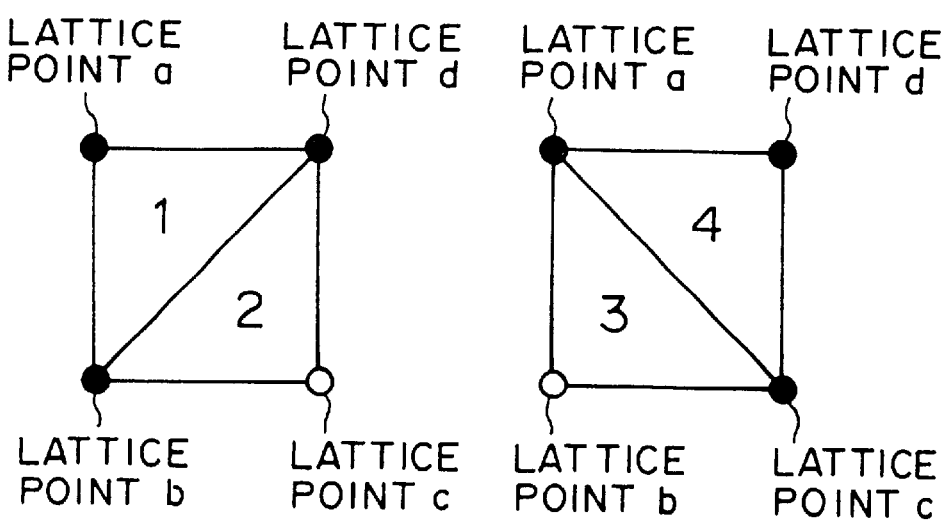

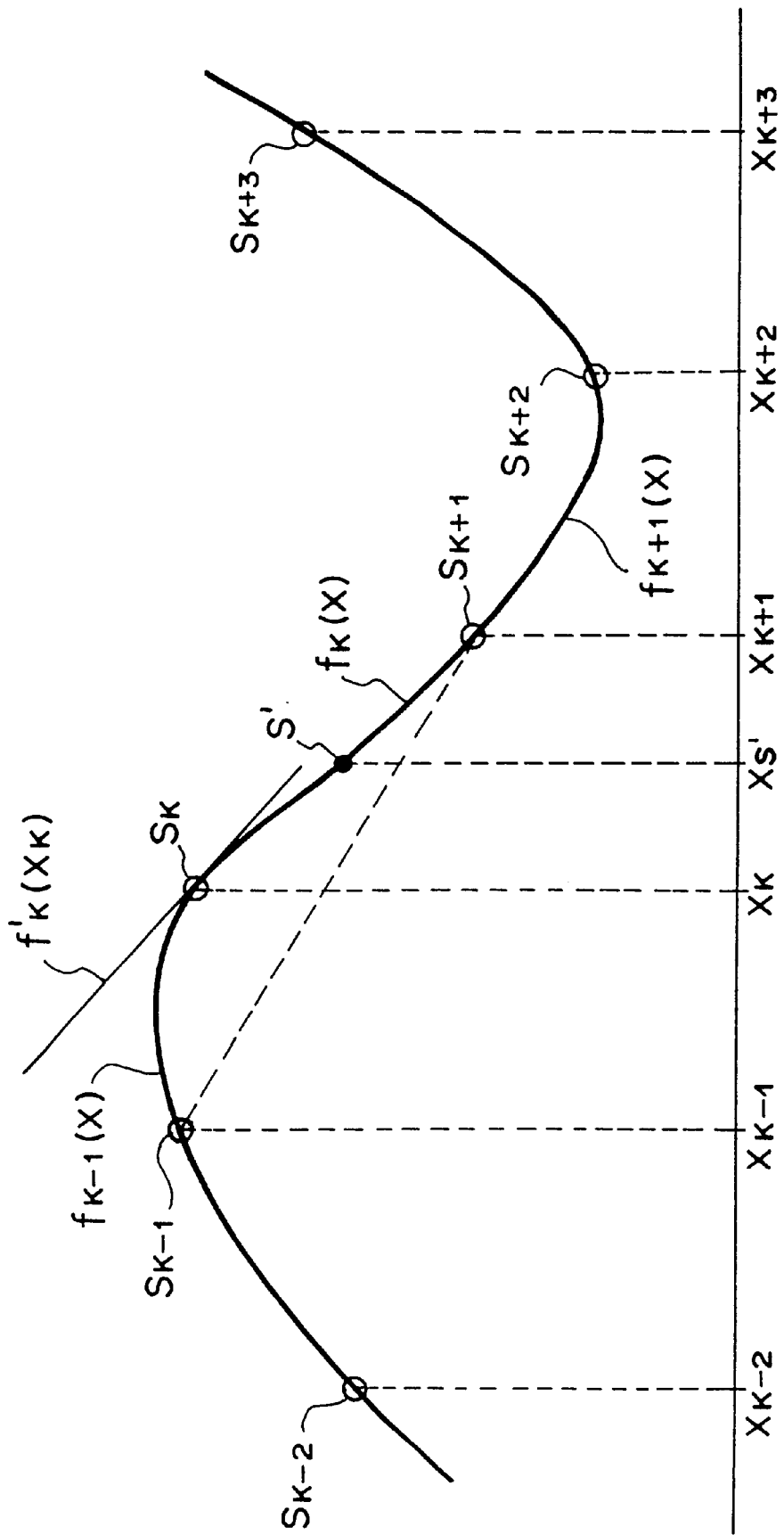

IMAGE EDGE PORTION

IMAGE EDGE PORTION

REGION OF INTEREST

IMAGE EDGE PORTION

IMAGE EDGE PORTION

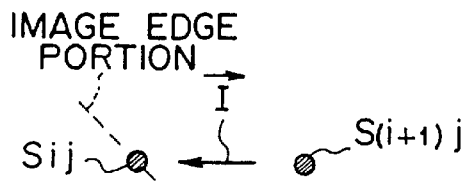
FIG. 10A
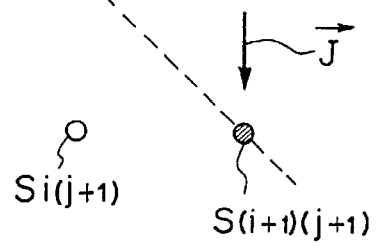
FIG. 10B
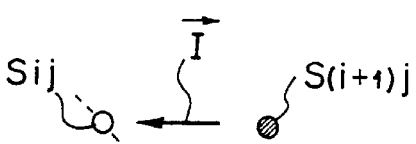
FIG. 10C
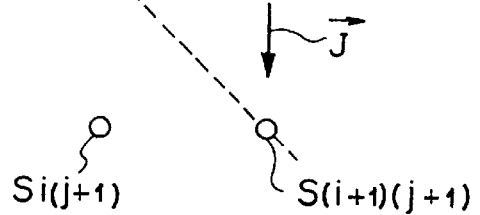
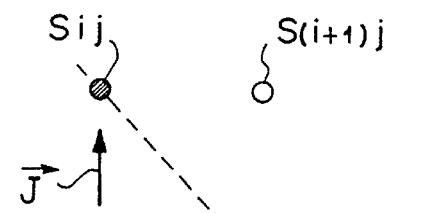
FIG. 10D
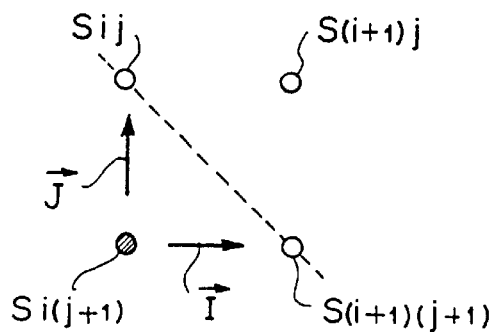

F I G.11A
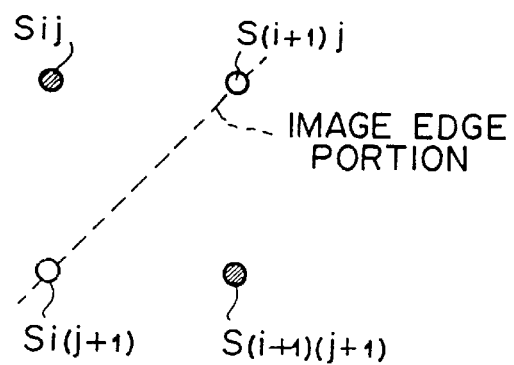
F I G.11B
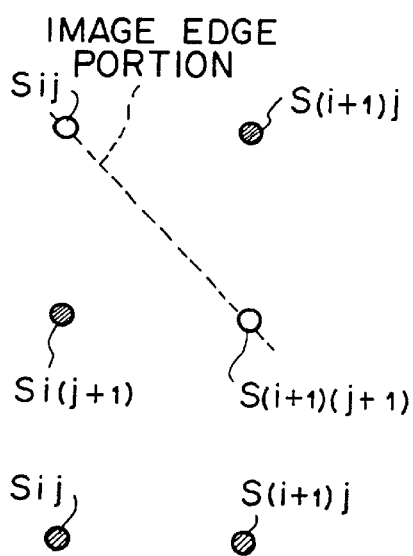
F I G.11C
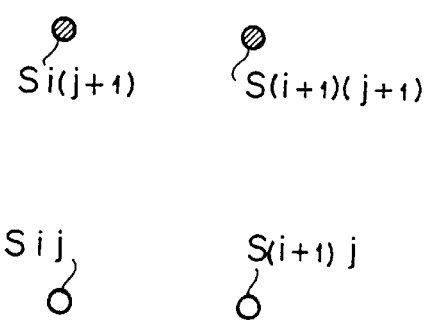
F I G.11D
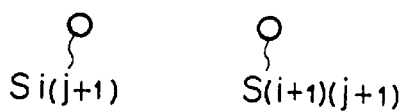

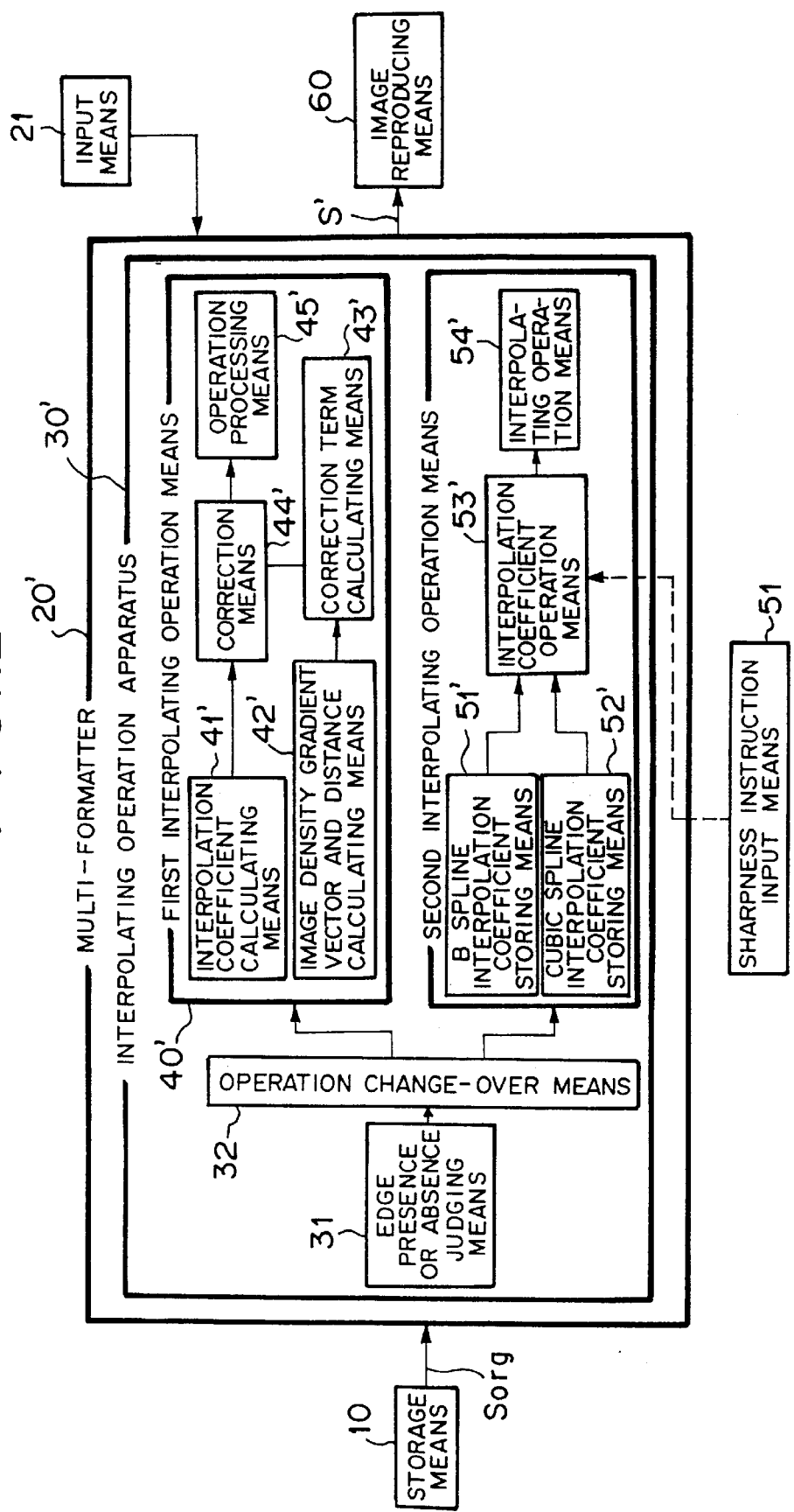
F I G.12

INTERPOLATING OPERATION METHOD AND APPARATUS FOR IMAGE SIGNALS

BACKGROUND OF THE INVENTION

1. Field of the Invention

This invention relates to an interpolating operation method and apparatus for an image signal.

2. Description of the Prior Art

Techniques for photoelectrically reading out a radiation image, which has been recorded on a photographic film, in order to obtain an image signal, carrying out appropriate image processing on the image signal, and then reproducing a visible image by use of the processed image signal have heretofore been known in various fields.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device. Radiation image recording and reproducing systems, which use stimulable phosphor sheets, are advantageous over conventional radiography using silver halide photographic materials, in that images can be recorded even when the energy intensity of the radiation, to which the stimulable phosphor sheet is exposed, varies over a wide range.

In image recording and reproducing systems, in which an image signal is obtained in the manner described above and a visible is reproduced from the image signal, in cases where the region of interest in the visible image is to be viewed in more detail, the region of interest is often enlarged and reproduced. In such cases, in order for the enlarged image to be obtained, a predetermined interpolating operation may be carried out on the original image signal, which has been obtained by reading out an original image and is made up of a series of image signal components representing sampling points in the original image, and an interpolation image signal, which is a secondary image signal and is made up of a number of image signal components different from that of the original image signal, may thereby be formed. A visible image may then be reproduced from the interpolation image signal. In such cases, depending upon the image size enlargement scale factor, it often occurs that several interpolation points overlap upon the sampling points.

Ordinarily, as an aid in facilitating the constitution of image input and output devices, the sampling points (i.e., picture elements of the original image), which are represented by the image signal components of the original image signal, are arrayed at predetermined intervals along horizontal and vertical directions in a square lattice-like form, and an image is thereby formed. In such cases, as the interpolating operation in the image size enlargement processing, a linear interpolating operation is carried out on the original image signal components representing four sampling points located in the vicinity of an interpolation point, which is to be newly set from the interpolating operation, and an interpolated image signal component corresponding to the interpolation point is thereby obtained.

For example, as illustrated in FIG. 5A, picture elements S, S, ... of an original image, which are indicated by the "o" mark, may be arrayed in a square lattice-like form. Interpolated image signal components corresponding to interpolation points S', S', ..., which are indicated by the "x" mark and are arrayed at intervals different from the intervals of the picture elements S, S, ..., may then be obtained. In such cases, for example, the interpolated image signal component corresponding to an interpolation point $S'_0$ is obtained in the manner described below.

In the calculation of the interpolated image signal component corresponding to the interpolation point $S'_0$, image signal components $S_A$, $S_B$, $S_C$, and $S_D$ representing four picture elements $S_A$, $S_B$, $S_C$, and $S_D$ of the original image, which picture elements are located in the vicinity of the interpolation point $S'_0$ so as to surround it (and which constitute the unit lattice constituting the square lattice), are used. (As an aid in facilitating the explanation, the same symbol as that of a picture element is used for the image signal component representing the picture element.) This means that a square mask of the unit lattice containing the interpolation point is set, and the image signal components representing the sampling points, which are located in the square mask, are used.

The pitch between the picture elements $S_A$ and $S_B$, the pitch between the picture elements $S_C$ and $S_D$, the pitch between the picture elements $S_A$ and $S_C$, and the pitch between the picture elements $S_B$ and $S_D$ are respectively taken as being equal to 1. Also, as illustrated in FIG. 5B, the distance between the picture element $S_A$ (or $S_C$) and the interpolation point $S'_0$, the distance being taken along the x axis direction (i.e., the horizontal direction), is represented by Tx. The distance between the picture element $S_A$ (or $S_B$) and the interpolation point $S'_0$, the distance being taken along the y axis direction (i.e., the vertical direction), is represented by Ty. In such cases, interpolated image signal components Sm and Sn, which respectively correspond to interpolation points Sm and Sn, that correspond to the positions of the interpolation point $S'_0$ taken respectively from the picture elements $S_A$ and $S_C$ along the x axis direction, are calculated with linear interpolating operations represented by Formulas (28) and (29) shown below.

$$Sm = (1-Tx)S_A + TxS_B \quad (28)$$

$$Sn = (1-Tx)S_C + TxS_D \quad (29)$$

Thereafter, a linear interpolating operation is carried out for the interpolation point $S'_0$ and with respect to the y axis direction by using the interpolated image signal components Sm and Sn, and an interpolated image signal component $S'_0$ is thereby calculated. The linear interpolating operation is represented by Formula (30) shown below.

$$S'_0 = (1-Ty)Sm + TySn \quad (30)$$

The same operations as those described above are also carried out for the other interpolation points S', S', ..., and the corresponding interpolated image signal components S', S', ... can thereby be obtained.

The interpolation method described above is not limited to the use in cases where the image size is to be enlarged, and can be applied when the image size enlargement or reduction is not carried out. The interpolation method described above can also be applied when details of the image are to be reproduced appropriately, e.g., when a high-resolution image is to be reproduced.

Also, the sampling points, from which the interpolated image signal component is to be calculated, are not limited to the four sampling points located in the vicinity of the interpolation point. For example, sampling points located in a square mask, which comprises 4×4 sampling points and contains the four sampling points located in the vicinity of the interpolation point, may be utilized.

For example, as in a radiation image containing bone patterns, a reproduced visible image ordinarily contains an image edge portion, at which the image density (or the luminance) changes sharply. It often occurs that the image edge portion is enlarged.

However, in cases where the picture elements of the original image are arrayed in the form of the square lattice (the unit lattice), it often occurs that the image edge portion extends in an oblique direction with respect to the square lattice. Also, in cases where the picture elements of the original image are arrayed in the form of a rhombic lattice, it often occurs that the image edge portion extends in the horizontal or vertical direction with respect to the rhombic lattice. In such cases, if the interpolating operations are carried out in accordance with Formulas (28), (29), and (30) shown above, step-like patterns will become perceptible at the enlarged image edge portion, which extends in the oblique direction with respect to the square lattice or in the horizontal or vertical direction with respect to the rhombic lattice.

For example, as illustrated in FIG. 7A, an image edge portion may extend in an oblique direction in an image. Microscopically, as illustrated in FIG. 7B, the boundary line (the image edge portion) between the region, in which points having a high image density (indicated by black dots) are located, and the region, in which points having a low image density (indicated by white dots) are located, may extend in the oblique direction in the image. In cases where an interpolated image signal component $S'_0$ is calculated by applying the aforesaid interpolating operation to the image edge portion, the interpolated image signal component $S'_0$ depends also upon an original image signal component $S_D$ representing the low image density. Therefore, as illustrated in FIG. 8B, an image signal component representing an intermediate image density slightly lower than the image density of the high-density picture elements $S_A$, $S_B$, and $S_C$ is obtained as the interpolated image signal component $S'_0$. As a result, when the enlarged image is reproduced in accordance with the obtained interpolated image signal component $S'_0$, the enlarged image is obtained in which the step-like pattern at the image edge portion has been enlarged as indicated by the broken line in FIG. 8B. Specifically, when the image size enlargement processing is carried out on the image edge portion, which extends in the oblique direction as shown in FIG. 7A, the step-like pattern at the image edge portion is enlarged as illustrated in FIG. 8A.

The enlarged step-like pattern at the image edge portion adversely affects the image quality in the region in the vicinity of the image edge portion. Therefore, there is the risk that an image capable of serving as an effective tool in, particularly, the efficient and accurate diagnosis of an illness, cannot be obtained.

The problems described above occur not only with an image, in which the sampling points are arrayed along horizontal and vertical directions in the square lattice-like form, but also with an image, in which an image edge portion extends in an oblique direction with respect to the array directions of the sampling points in a unit lattice, such as an image, in which the sampling points are arrayed along oblique directions in the form of a rhombic lattice and an image edge portion extends along the horizontal or vertical direction.

The problems described above occur when the interpolated image signal component corresponding to the interpolation point $S'_0$ is calculated by using only the original image signal components $S_A$, $S_B$, $S_C$, and $S_D$ representing the picture elements $S_A$, $S_B$, $S_C$, and $S_D$ of the original image (four sampling points located in the vicinity of the interpolation point), which picture elements constitute the unit lattice containing the interpolation point. The same problems occur ordinarily when an interpolated image signal component corresponding to an interpolation point is calculated by using the image signal components representing the picture elements, which are located in a square mask containing the interpolation point.

As for image portions other than the image edge portion, i.e. as for a flat image density portion, at which the change in the image density is unsharp, and a portion inward from and surrounded by the image edge portion (these image portions will hereinbelow be referred to simply as the flat portion), it is desired that the sharpness of the flat portion in the reproduced visible image can be adjusted freely by the person, who views the image, such that a reproduced image having good image quality can be obtained.

SUMMARY OF THE INVENTION

The primary object of the present invention is to provide an interpolating operation method for an image signal, wherein interpolated image signal components corresponding to interpolation points, which are located at an image edge portion, and interpolation points, which are located at a flat portion, are obtained such that a visible image having good image quality can be reproduced from the interpolated image signal components and used as an effective tool in, particularly, the accurate and efficient diagnosis of an illness, i.e. such that a visible image, in which a character pattern and an image edge portion are free from any step-like pattern and are sharp and a flat portion has an appropriate level of sharpness, can be reproduced from the interpolated image signal components.

Another object of the present invention is to provide an apparatus for carrying out the interpolating operation method for an image signal.

An interpolating operation method for an image signal in accordance with the present invention is characterized by changing the interpolating operation process, depending upon whether an interpolation point is located at an image edge portion or at a flat image density portion, such that an interpolating operation process capable of obtaining a sharp image free from any step-like pattern may be applied with respect to the image edge portion, and such that an interpolating operation process capable of obtaining a smooth image or an interpolating operation process enabling sharpness to be adjusted may be applied with respect to the flat portion.

Specifically, the present invention provides an interpolating operation method for an image signal, wherein an interpolated image signal component corresponding to an interpolation point is calculated from original image signal components of an original image signal representing an original image, which represent a plurality of sampling points arrayed at predetermined intervals and in a lattice-like form, the method comprising the steps of:

i) making a judgment as to whether the interpolation point belongs to an image edge portion, at which the change in the original image signal is sharp, or belongs to a flat portion, at which the change in the original image signal is unsharp, and ii) changing interpolating operation processes, one of which is to be employed for the interpolation point, over to each other in accordance with the results of the judgment.

In the interpolating operation method for an image signal in accordance with the present invention, the sampling points arrayed at predetermined intervals and in a lattice-like form. For example, the sampling points may be arrayed along horizontal and vertical directions and in a square lattice-like form or a rectangular lattice-like form. Alternatively, the sampling points may be arrayed along oblique directions and in a rhombic lattice-like form. Also, the lattice intervals may be kept the same for the two array directions or may be varied for the two array directions.

The judgment as to whether the interpolation point belongs to the image edge portion or the flat portion can be made by, for example, comparing the values of the original image signal components representing four sampling points, which constitute the unit lattice containing the interpolation point, with one another.

By way of example, as the interpolating operation process, which is employed in cases where, as a result of the judgment, it has been judged that the interpolation point belongs to the image edge portion, the interpolating operation process described in (1) or (2) below may be employed.

(1) An interpolating operation process comprising the steps of:
  a) specifying the direction, along which the image edge portion extends, with respect to the array directions of the sampling points in a unit lattice, and
  b) changing selection processes for selecting the original image signal components, from which the interpolated image signal component corresponding to the interpolation point is to be calculated, over to each other in accordance with the direction, along which the image edge portion extends.

(2) An interpolating operation process comprising the steps of:
  a) calculating each of interpolation coefficients, by which the corresponding one of the original image signal components is to be multiplied, from the original image signal components, which represent a plurality of the sampling points located in the vicinity of the interpolation point,
  b) calculating an image density gradient vector at the interpolation point on the original image, which is represented by the original image signal components,
  c) calculating the distance between a line segment, which intersects perpendicularly to the image density gradient vector, and each of the sampling points located in the vicinity of the interpolation point,
  d) correcting the interpolation coefficients such that the interpolation coefficient, by which the corresponding original image signal component is to be multiplied, may become small for a sampling point, for which the image density gradient vector and/or the distance is comparatively large, and
  e) multiplying the original image signal component by the corresponding corrected interpolation coefficient.

In cases where the interpolating operation process described in (1) above is employed, the direction, along which the image edge portion extends, may be specified by, for example:

(a) grouping each of two sets of sampling points, each set being constituted of two sampling points, which are located at two diagonal positions facing each other in the unit lattice, that contains the interpolation point therein,
  calculating the difference between the original image signal components representing the two sampling points, which constitute each of the two sets of sampling points, and
  comparing the differences, which have been calculated for the two sets of sampling points, with each other; or (b) grouping each of two sets of sampling points, each, set being constituted of two sampling points, which are located at two diagonal positions facing each other in the unit lattice, that contains the interpolation point therein,
  calculating the difference between the original image signal components representing the two sampling points, which constitute each of the two sets of sampling points,
  comparing the differences, which have been calculated for the two sets of sampling points, with each other, and
  carrying out an operation in accordance with the original image signal components representing the sampling points, which are located around the unit lattice, that contains the interpolation point therein; or (c) calculating an image density gradient vector with respect to each of the two array directions of the sampling points in the unit lattice, the calculation being made from the original image signal components representing four sampling points, which constitute the unit lattice, that contains the interpolation point therein, and
  making a judgment from the magnitude and the product of the two image density gradient vectors, which have been calculated with respect to the two array directions of the sampling points in the unit lattice.

Also, in cases where the interpolating operation process described in (1) above is employed, the selection processes for selecting the original image signal components to be used in the calculation of the interpolated image signal component, the selection processes being changed over to each other in accordance with the direction, along which the image edge portion extends, may comprise, for example:

(i) a selection process, which is employed in cases where it has been specified that the image edge portion extends along an oblique direction with respect to the array directions of the sampling points in the unit lattice, the selection process comprising the steps of:
  dividing the unit lattice into two triangular regions with the image edge portion serving as the boundary therebetween,
  selecting a triangular region, which contains the interpolation point therein, from the two triangular regions, and
  selecting the original image signal components, which represent the three sampling points, that constitute the triangular region containing the interpolation point therein, and (ii) a selection process, which is employed in cases where it has been specified that the image edge portion extends along a direction parallel to one of the array directions of the sampling points in the unit lattice, the selection process comprising selecting the original image signal components, which represent the four sampling points, that constitute the unit lattice containing the interpolation point therein.

In cases where the interpolated image signal component corresponding to the interpolation point is calculated from the original image signal components representing the three sampling points, the interpolating operation may be carried out with one of various functions, such as a linear function, a second order function, and a higher order function.

The interpolating operation process, which is employed in cases where, as a result of the judgment, it has been judged that the interpolation point belongs to the flat portion, may be an interpolating operation process, with which the sharpness of the flat portion is rendered variable. By way of example, the interpolating operation process, with which the sharpness of the flat portion is rendered variable, may be:

(I) a spline interpolating operation process, or (II) an interpolating operation process, comprising the steps of:

linearly combining interpolation coefficients Bij and Cij, which correspond to each other and are set for each of the original image signal components Yij, in two different interpolating functions f and g (for example, a cubic spline interpolating operation function and a B spline interpolating operation function) for obtaining two interpolation images having different levels of sharpness, which functions are represented by Formulas (24) and (25), the linear combination being carried out with Formula (26) by use of a variable factor $\alpha$, where $\alpha$ is set to be one of all real numbers, a new interpolation coefficient Aij being obtained from the linear combination, and carrying out an interpolating operation on the original image signal components Yij by using an interpolating function h having the new interpolation coefficient Aij, which function is represented by Formula (27):

$$f = \Sigma Bij \cdot Yij \quad (24)$$

$$g = \Sigma Cij \cdot Yij \quad (25)$$

$$Aij = (1-\alpha)Bij + \alpha Cij \quad (26)$$

$$h = \Sigma Aij \cdot Yij \quad (27)$$

in which i=1, 2, . . . , j=1, 2, . . . and $\alpha$ represents one of all real numbers.

In cases where it has been judged that the interpolation point belongs to the flat portion, and the interpolating operation process, with which the sharpness of the flat portion is rendered variable, is employed, the interpolating operation process defined above for the image edge portion need not necessarily be carried out. Specifically, in cases where the interpolating operation process, with which the sharpness of the flat portion is rendered variable, is at least employed when it has been judged that the interpolation point belongs to the flat portion, any of conventional interpolating operation processes may be utilized as the interpolating operation process for the image edge portion.

As the spline interpolating operation process described in (I) above, by way of example, one of the interpolating operation processes described in (A), (B), and (C) below may be employed.

(A) The spline interpolating operation process is an interpolating operation process for obtaining an interpolated image signal component with Formula (1), $$Y_p = a_{k-1}Y_{k-1} + a_k Y_k + a_{k+1}Y_{k+1} + a_{k+2}Y_{k+2} \quad (1)$$

in which $Y_{k-1}$, $Y_k$, $Y_{k+1}$, and $Y_{k+2}$ represent the original image signal components representing sampling points serving as picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the process comprising the steps of:

a) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, a third-order spline interpolating function between the picture elements $X_k$ and $X_{k+1}$ is represented by $f_k$, a third-order spline interpolating function between the picture elements $X_{k-1}$ and $X_k$ is represented by $f_{k-1}$, and a third-order spline interpolating function between the picture elements $X_{k+1}$ and $X_{k+2}$ is represented by $f_{k+1}$:

① the spline interpolating function $f_k$ at the picture elements $X_k$ and $X_{k+1}$ may satisfy the original image signal components $Y_k$ and $Y_{k+1}$, as represented by Formulas (2) and (3):

$$f_k(X_k) = Y_k \quad (2)$$

$$f_k(X_{k+1}) = Y_{k+1} \quad (3)$$

② the first-order differential coefficient of the spline interpolating function $f_k$ at the picture element $X_k$ may coincide with the first-order differential coefficient of the spline interpolating function $f_{k-1}$ at the picture element $X_k$, as represented by Formula (4):

$$f_k'(X_k) = f_{k-1}'(X_k) \quad (4)$$

③ the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (5):

$$f_k'(X_{k+1}) = f_{k+1}'(X_{k+1}) \quad (5)$$

④ the first-order differential coefficient of the spline interpolating function $f_k$ at the picture element $X_k$ may have an inclination of an arbitrary parameter $\alpha$ with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (6), the arbitrary parameter $\alpha$ being selected previously and determining the sharpness of a secondary image represented by the interpolation image signal obtained from the interpolating operation, $$f_k'(X_k) = \alpha(Y_{k+1} - Y_{k-1})/(X_{k+1} - X_{k-1}) \quad (6)$$

and

⑤ the first-order differential coefficient of the spline interpolating function $f_k$ at the picture element $X_{k+1}$ may have an inclination of the parameter α with respect to the gradient of the original image signal components $Y_k$ and $Y_{k+2}$ representing the picture elements $X_k$ and $X_{k+2}$, which are located before and after the picture element $X_{k+1}$, as represented by Formula (7):

$$f_k'(X_{k+1})=\alpha(Y_{k+2}-Y_k)/(X_{k+2}-X_k) \qquad (7)$$

and b) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

(B) The spline interpolating operation process is an interpolating operation process for obtaining an interpolated image signal component with Formula (1), $$Y_p = a_{k-1}Y_{k-1} + a_k Y_k + a_{k+1}Y_{k+1} + a_{k+2}Y_{k+2} \qquad (1)$$

in which $Y_{k-1}$, $Y_k$, $Y_{k+1}$, and $Y_{k+2}$ represent the original image signal components representing sampling points serving as picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the process comprising the steps of:

a) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, a third-order spline interpolating function between the picture elements $X_k$ and $X_{k+1}$ is represented by $f_k$, a third-order spline interpolating function between the picture elements $X_{k-1}$ and $X_k$ is represented by $f_{k-1}$, and a third-order spline interpolating function between the picture elements $X_{k+1}$ and $X_{k+2}$ is represented by $f_{k+1}$:

① the spline interpolating function $f_k$ at the picture elements $X_k$ and $X_{k+1}$ may slightly deviate from the original image signal components $Y_k$ and $Y_{k+1}$ in accordance with an arbitrary parameter β, as represented by Formulas (12) and (13), the arbitrary parameter β being selected previously and determining the sharpness of a secondary image represented by the interpolation image signal obtained from the interpolating operation, $$f_k(X_k) = -0.5\beta Y_{k-1} + (1+\beta)Y_k - 0.5\beta Y_{k+1} \qquad (12)$$

$$f_k(X_{k+1}) = -0.5\beta Y_k + (1+\beta)Y_{k+1} - 0.5\beta Y_{k+2} \qquad (13)$$

② the first-order differential coefficient of the spline interpolating function $f_k$ at the picture element $X_k$ may coincide with the first-order differential coefficient of the spline interpolating function $f_{k-1}$ at the picture element $X_k$, as represented by Formula (4):

$$f_k'(X_k) = f_{k-1}'(X_k) \qquad (4)$$

③ the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (5):

$$f_k'(X_{k+1}) = f_{k+1}'(X_{k+1}) \qquad (5)$$

④ the first-order differential coefficient of the spline interpolating function $f_k$ at the picture element $X_k$ may coincide with the gradient of the original image signal components $Y_{k-1}$ and $Y_{k+1}$ representing the picture elements $X_{k-1}$ and $X_{k+1}$, which are located before and after the picture element $X_k$, as represented by Formula (14):

$$f_k'(X_k) = (Y_{k+1}-Y_{k-1})/(X_{k+1}-X_{k-1}) \qquad (14)$$

and

⑤ the first-order differential coefficient of the spline interpolating function $f_k$ at the picture element $X_{k+1}$ may coincide with the gradient of the original image signal components $Y_k$ and $Y_{k+2}$ representing the picture elements $X_k$ and $X_{k+2}$, which are located before and after the picture element $X_{k+1}$, as represented by Formula (15):

$$f_k'(X_{k+1}) = (Y_{k+2}-Y_k)/(X_{k+2}-X_k) \qquad (15)$$

and b) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

(C) The spline interpolating operation process is an interpolating operation process for obtaining an interpolated image signal component with Formula (1), $$Y_p = a_{k-1}Y_{k-1} + a_k Y_k + a_{k+1}Y_{k+1} + a_{k+2}Y_{k+2} \qquad (1)$$

in which $Y_{k-1}$, $Y_k$, $Y_{k+1}$, and $Y_{k+2}$ represent the original image signal components representing sampling points serving as picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the process comprising the steps of:

a) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+1}$ such that, in cases where the original image signal components representing the two picture elements $X_{k-1}$, and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, a third-order spline interpolating function between the picture elements $X_k$ and $X_{k+1}$ is represented by $f_k$, a third-order spline interpolating function between the picture elements $X_{k-1}$ and $X_k$ is represented by $f_{k-1}$, and a third-order spline interpolating function between the picture elements $X_{k+1}$ and $X_{k+2}$ is represented by $f_{k+1}$:

① the spline interpolating function $f_k$ at the picture elements $X_k$ and $X_{k+1}$ may satisfy the original image signal components $Y_k$ and $Y_{k+1}$, as represented by Formulas (2) and (3):

$$f_k(X_k)=Y_k \qquad (2)$$

$$f_k(X_{k+1})=Y_{k+1} \qquad (3)$$

② the first-order differential coefficient of the spline interpolating function $f_k$ at the picture element $X_k$ may coincide with the first-order differential coefficient of the spline interpolating function $f_{k-1}$ at the picture element $X_k$, as represented by Formula (4):

$$f_k'(X_k)=f_{k-1}'(X_k) \qquad (4)$$

③ the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (5):

$$f_k'(X_{k+1})=f_{k+1}'(X_{k+1}) \qquad (5)$$

④ the first-order differential coefficient of the spline interpolating function $f_k$ at the picture element $X_k$ may have an inclination of an arbitrary parameter $\alpha$ with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (6), the arbitrary parameter $\alpha$ being selected previously and determining the sharpness of a secondary image represented by the interpolation image signal obtained from the interpolating operation, $$f_k'(X_k)=\alpha(Y_{k+1}-Y_{k-1})/(X_{k+1}-X_{k-1}) \qquad (6)$$

and

⑤ the first-order differential coefficient of the spline interpolating function $f_k$ at the picture element $X_{k+1}$ may have an inclination of the parameter $\alpha$ with respect to the gradient of the original image signal components $Y_k$ and $Y_{k+2}$ representing the picture elements $X_k$ and $X_{k+2}$, which are located before and after the picture element $X_{k+1}$, as represented by Formula (7):

$$f_k'(X_{k+1})=\alpha(Y_{k+2}-Y_k)/(X_{k+2}-X_k) \qquad (7)$$

b) calculating interpolation coefficients $b_{k-1}$, $b_k$, $b_{k+1}$, and $b_{k+2}$ respectively corresponding to the original image signal components $Y_{k-1}$, $Y_k$, $Y_{k+1}$, and $Y_{k+2}$ such that:

⑥ the spline interpolating function $f_k$ at the picture elements $X_k$ and $X_{k+1}$ may slightly deviate from the original image signal components $Y_k$ and $Y_{k+1}$ in accordance with an arbitrary parameter $\beta$, as represented by Formulas (12) and (13), the arbitrary parameter $\beta$ being selected previously and determining the sharpness of the secondary image represented by the interpolation image signal obtained from the interpolating operation, $$f_k(X_k)=-0.5\beta Y_{k-1}+(1+\beta)Y_k-0.5\beta Y_{k+1} \qquad (12)$$

$$f_k(X_{k+1})=-0.5\beta Y_k+(1+\beta)Y_{k+1}-0.5\beta Y_{k+2} \qquad (13)$$

⑦ the first-order differential coefficient of the spline interpolating function $f_k$ at the picture element $X_k$ may coincide with the first-order differential coefficient of the spline interpolating function $f_{k-1}$ at the picture element $X_k$, as represented by Formula (4):

$$f_k'(X_k)=f_{k-1}'(X_k) \qquad (4)$$

⑧ the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (5):

$$f_k'(X_{k+1})=f_{k+1}'(X_{k+1}) \qquad (5)$$

⑨ the first-order differential coefficient of the spline interpolating function $f_k$ at the picture element $X_k$ may coincide with the gradient of the original image signal components $Y_{k-1}$ and $Y_{k+1}$ representing the picture elements $X_{k-1}$ and $X_{k+1}$, which are located before and after the picture element $X_k$, as represented by Formula (14):

$$f_k'(X_k)=(Y_{k+1}-Y_{k-1})/(X_{k+1}-X_{k-1}) \qquad (14)$$

and

⑩ the first-order differential coefficient of the spline interpolating function $f_k$ at the picture element $X_{k+1}$ may coincide with the gradient of the original image signal components $Y_k$ and $Y_{k+2}$ representing the picture elements $X_k$ and $X_{k+2}$, which are located before and after the picture element $X_{k+1}$, as represented by Formula (15):

$$f_k'(X_{k+1})=(Y_{k+2}-Y_k)/(X_{k+2}-X_k) \qquad (15)$$

c) calculating a mean value of the set of the interpolation coefficients $a_{k-1}$ and $b_{k-1}$, a mean value of the set of the interpolation coefficients $a_k$ and $b_k$, a mean value of the set of the interpolation coefficients $a_{k+1}$ and $b_{k+1}$, and a mean value of the set of the interpolation coefficients $a_{k+2}$ and $b_{k+2}$, which sets respectively correspond to the original image signal components $Y_{k-1}$, $Y_k$, $Y_{k+1}$, and $Y_{k+2}$, the calculated mean values being taken as the values of new interpolation coefficients $a_{k+1}$, $a_k$, $a_{k+1}$, and $a_{k+2}$, and d) calculating the interpolated image signal component $Y_p$ corresponding to the interpolation point $X_p$ in accordance with the calculated new interpolation coefficients $a_{k-1}$, $a_k$, $a_{k+1}$, and $a_{k+2}$, and the original image signal components $Y_{k-1}$, $Y_k$, $Y_{k+1}$ and $Y_{k+2}$.

In the interpolating operation process described in (A) above, the calculated interpolation coefficients $a_{k-1}$, $a_k$, $a_{k+1}$, and $a_{k+2}$ may be respectively represented by Formulas (8), (9), (10), and (11):

$$a_{k-1}=-(\alpha/2)t(t-1)^2 \qquad (8)$$

$$a_k=(2-\alpha/2)t^3-(3-\alpha/2)t^2+1 \qquad (9)$$

$$a_{k+1}=(\alpha/2-2)t^3+(3-\alpha)t^2+(\alpha/2)t \qquad (10)$$

$$a_{k+2}=(\alpha/2)t^2(t-1) \qquad (11)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

In the interpolating operation process described in (B) above, the calculated interpolation coefficients $a_{k-1}$, $a_k$, $a_{k+1}$, and $a_{k+2}$ may be respectively represented by Formulas (16), (17), (18), and (19):

$$a_{k-1} = -(\beta + 1/2)t^3 + (3\beta/2 + 1)t^2 - (1/2)t - \beta/2 \quad (16)$$

$$a_k = 3(\beta + 1/2)t^3 - (9\beta/2 + 5/2)t^2 + \beta + 1 \quad (17)$$

$$a_{k+1} = -3(\beta + 1/2)t^3 + (9\beta/2 + 2)t^2 + (1/2)t - \beta/2 \quad (18)$$

$$a_{k+2} = (\beta + 1/2)t^3 - (3\beta/2 + 1/2)t^2 \quad (19)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

In the interpolating operation process described in (C) above, the calculated new interpolation coefficients $a_{k-1}$, $a_k$, $a_{k+1}$, and $a_{k+2}$, which represent the mean values, may be respectively represented by Formulas (20), (21), (22), and (23):

$$a_{k-1} = -\{(\alpha + 2\beta + 1)/4\}t^3 + \{(2\alpha + 3\beta + 2)/4\}t^2 - \{(\alpha + 1)/4\}t - \beta/4 \quad (20)$$

$$a_k = \{(-\alpha + 6\beta + 7)/4\}t^3 + \{(\alpha - 9\beta - 11)/4\}t^2 + \beta/2 + 1 \quad (21)$$

$$a_{k+1} = \{(\alpha - 6\beta - 7)/4\}t^3 + \{(-2\alpha + 9\beta + 10)/4\}t^2 + \{(\alpha + 1)/4\}t - \beta/4 \quad (22)$$

$$a_{k+2} = \{(\alpha + 2\beta + 1)/4\}t^3 - \{(\alpha + 3\beta + 1)/4\}t^2 \quad (23)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

The present invention also provides an apparatus for carrying out the interpolating operation method for an image signal in accordance with the present invention. Specifically, the present invention also provides an interpolating operation apparatus for an image signal, wherein an interpolated image signal component corresponding to an interpolation point is calculated from original image signal components of an original image signal representing an original image, which represent a plurality of sampling points arrayed at predetermined intervals and in a lattice-like form, the apparatus comprising:

i) an edge presence or absence judging means for making a judgment as to whether the interpolation point belongs to an image edge portion, at which the change in the original image signal is sharp, or belongs to a flat portion, at which the change in the original image signal is unsharp, ii) a first interpolating operation means for calculating an interpolated image signal component corresponding to an interpolation point, which belongs to the image edge portion, iii) a second interpolating operation means for calculating an interpolated image signal component corresponding to an interpolation point, which belongs to the flat portion, and iv) an operation change-over means for changing the first interpolating operation means and the second interpolating operation means over to each other, such that the first interpolating operation means may be utilized in cases where, as a result of the judgment made by the edge presence or absence judging means, it has been judged that the interpolation point belongs to the image edge portion, and such that the second interpolating operation means may be utilized in cases where, as a result of the judgment made by the edge presence or absence judging means, it has been judged that the interpolation point belongs to the flat portion.

By way of example, as the first interpolating operation means, the first interpolating operation means described in (1) or (2) below may be employed.

(1) A first interpolating operation means comprising:
  a) an edge extending direction specifying means for specifying the direction, along which the image edge portion extends, with respect to the array directions of the sampling points in a unit lattice,
  b) a first operation means comprising:
    a region dividing means for dividing the unit lattice into two triangular regions with the image edge portion serving as the boundary therebetween, the image edge portion extending along an oblique direction with respect to the array directions of the sampling points in the unit lattice,
    a region selecting means for selecting a triangular region, which contains the interpolation point therein, from the two triangular regions, and
    an operation means for calculating the interpolated image signal component corresponding to the interpolation point, the calculation being made from the original image signal components, which represent the three sampling points, that constitute the triangular region containing the interpolation point therein,
  c) a second operation means for calculating the interpolated image signal component corresponding to the interpolation point, the calculation being made from the original image signal components, which represent the four sampling points, that constitute the unit lattice containing the interpolation point therein, and
  d) an operation selecting means for:
    selecting the first operation means in cases where, as a result of the specifying carried out by the edge extending direction specifying means, it has been specified that the image edge portion extends along an oblique direction with respect to the array directions of the sampling points in the unit lattice, and
    selecting the second operation means in cases where, as a result of the specifying carried out by the edge extending direction specifying means, it has been specified that the image edge portion extends along a direction parallel to one of the array directions of the sampling points in the unit lattice.

(2) A first interpolating operation means comprising:
  a) an interpolation coefficient calculating means for calculating each of interpolation coefficients, by which the corresponding one of the original image signal components is to be multiplied, from the original image signal components, which represent a plurality of the sampling points located in the vicinity of the interpolation point,
  b) an image density gradient vector calculating means for calculating an image density gradient vector at the interpolation point on the original image, which is represented by the original image signal components, c) a distance calculating means for calculating the distance between a line segment, which intersects perpendicularly to the image density gradient vector, and each of the sampling points located in the vicinity of the interpolation point, d) a correction means for correcting the interpolation coefficients such that the interpolation coefficient, by which the corresponding original image signal component is to be multiplied, may become small for a sampling point, for which the image density gradient vector and/or the distance is comparatively large, and e) an operation processing means for multiplying the original image signal component by the corresponding interpolation coefficient, which has been corrected by the correction means.

In cases where the first interpolating operation means described in (1) above is employed, the edge extending direction specifying means may specify the direction, along which the image edge portion extends, by, for example:

(a) grouping each of two sets of sampling points, each set being constituted of two sampling points, which are located at two diagonal positions facing each other in the unit lattice, that contains the interpolation point therein, calculating the difference between the original image signal components representing the two sampling points, which constitute each of the two sets of sampling points, and comparing the differences, which have been calculated for the two sets of sampling points, with each other; or (b) grouping each of two sets of sampling points, each set being constituted of two sampling points, which are located at two diagonal positions facing each other in the unit lattice, that contains the interpolation point therein, calculating the difference between the original image signal components representing the two sampling points, which constitute each of the two sets of sampling points, comparing the differences, which have been calculated for the two sets of sampling points, with each other, and carrying out an operation in accordance with the original image signal components representing the sampling points, which are located around the unit lattice, that contains the interpolation point therein; or (c) calculating an image density gradient vector with respect to each of the two array directions of the sampling points in the unit lattice, the calculation being made from the original image signal components representing four sampling points, which constitute the unit lattice, that contains the interpolation point therein, and making a judgment from the magnitude and the product of the two image density gradient vectors, which have been calculated with respect to the two array directions of the sampling points in the unit lattice.

Regardless of the constitution of the first interpolating operation means, the second interpolating operation means may comprise:

an input means for inputting an instruction concerning the alteration of sharpness of the flat portion from the exterior, and an interpolating operation means, with which the sharpness of the flat portion is capable of being altered in accordance with the instruction inputted from the input means.

By way of example, the interpolating operation means, with which the sharpness of the flat portion is capable of being altered, may be:

(I) a spline interpolating operation means, or (II) an interpolating operation means for:

linearly combining interpolation coefficients Bij and Cij, which correspond to each other and are set for each of the original image signal components Yij, in two different interpolating functions f and g (for example, a cubic spline interpolating operation function and a B spline interpolating operation function) for obtaining two interpolation images having different levels of sharpness, which functions are represented by Formulas (24) and (25), the linear combination being carried out with Formula (26), a new interpolation coefficient Aij being obtained from the linear combination, and carrying out an interpolating operation on the original image signal components Yij by using an interpolating function h having the new interpolation coefficient Aij, which function is represented by Formula (27), an interpolation image signal being obtained from the interpolating operation, the interpolation image signal being made up of a series of image signal components, which occur at intervals different from those of the original image signal components Yij:

$$f = \Sigma Bij \cdot Yij \quad (24)$$

$$g = \Sigma Cij \cdot Yij \quad (25)$$

$$Aij = (1-\alpha)Bij + \alpha Cij \quad (26)$$

$$h = \Sigma Aij \cdot Yij \quad (27)$$

in which i=1, 2, ..., j=1, 2, ..., and $\alpha$ represents one of all real numbers.

As the spline interpolating operation means described in (I) above, by way of example, one of the interpolating operation means described in (A), (B), and (C) below may be employed.

(A) The spline interpolating operation means is an interpolating operation means for obtaining an interpolated image signal component with Formula (1), $$Y_p = a_{k-1} Y_{k-1} + a_k Y_k + a_{k+1} Y_{k+1} + a_{k+2} Y_{k+2} \quad (1)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the spline interpolating operation means comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (8), (9), (10), and (11):

$$a_{k-1} = -(\alpha/2)t(t-1)^2 \quad (8)$$

$$a_k = (2-\alpha/2)t^3 - (3-\alpha/2)t^2 + 1 \tag{9}$$

$$a_{k+1} = (\alpha/2 - 2)t^3 + (3-\alpha)t^2 + (\alpha/2)t \tag{10}$$

$$a_{k+2} = (\alpha/2)t^2(t-1) \tag{11}$$

in which α represents the parameter determining the sharpness of a secondary image represented by the interpolation image signal obtained from the interpolating operation, and t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter α, which determines the sharpness of the secondary image reproduced from the interpolation image signal obtained from the interpolating operation, 3) an interpolation coefficient operation means for calculating the interpolation coefficients $a_{k-1}$, $a_k$, $a_{k+1}$, and $a_{k+2}$ in accordance with the parameter α, the calculation being carried out from the interpolation coefficients, which are stored in the storage means, and the parameter α inputted from the input means, and 4) an interpolating operation means for storing Formula (1) as the operation formula, and calculating the value of the interpolated image signal component $Y_p$, which corresponds to the interpolation point $X_p$, with Formula (1) in accordance with the interpolation coefficients $a_{k-1}$, $a_k$, $a_{k+1}$, and $a_{k+2}$, which have been calculated by the interpolation coefficient operation means, and the original image signal components $Y_{k-1}$, $Y_k$, $Y_{k+1}$, and $Y_{k+2}$.

(B) The spline interpolating operation means is an interpolating operation means for obtaining an interpolated image signal component with Formula (1), $$Y_p = a_{k-1}Y_{k-1} + a_k Y_k + a_{k+1}Y_{k+1} + a_{k+2}Y_{k+2} \tag{1}$$

in which $Y_{k-1}$, $Y_k$, $Y_{+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the spline interpolating operation means comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (16), (17), (18), and (19):

$$a_{k-1} = -(\beta + 1/2)t^3 + (3\beta/2 + 1)t^2 - (1/2)t - \beta/2 \tag{16}$$

$$a_k = 3(\beta + 1/2)t^3 - (9\beta/2 + 5/2)t^2 + \beta + 1 \tag{17}$$

$$a_{k+1} = -3(\beta + 1/2)t^3 + (9\beta/2 + 2)t^2 + (1/2)t - \beta/2 \tag{18}$$

$$a_{k+2} = (\beta + 1/2)t^3 - (3\beta/2 + 1/2)t^2 \tag{19}$$

in which β represents the parameter determining the sharpness of a secondary image represented by the interpolation image signal obtained from the interpolating operation, and t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter β, which determines the sharpness of the secondary image reproduced from the interpolation image signal obtained from the interpolating operation, 3) an interpolation coefficient operation means for calculating the interpolation coefficients $a_{k-1}$, $a_k$, $a_{k+1}$, and $a_{k+2}$ in accordance with the parameter β, the calculation being carried out from the interpolation coefficients, which are stored in the storage means, and the parameter β inputted from the input means, and 4) an interpolating operation means for storing Formula (1) as the operation formula, and calculating the value of the interpolated image signal component $Y_p$, which corresponds to the interpolation point $X_p$, with Formula (1) in accordance with the interpolation coefficients $a_{k-1}$, $a_k$, $a_{k+1}$, and $a_{k+2}$, which have been calculated by the interpolation coefficient operation means, and the original image signal components $Y_{k-1}$, $Y_k$, $Y_{k+1}$, and $Y_{k+2}$.

(C) The spline interpolating operation means is an interpolating operation means for obtaining an interpolated image signal component with Formula (1), $$Y_p = a_{k-1}Y_{k-1} + a_k Y_k + a_{k+1}Y_{k+1} + a_{k+2}Y_{k+2} \tag{1}$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the spline interpolating operation means comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $Y_{k-1}$, $X_k$, $X_{k+1}$, and $X_{k+2}$ in the original image, and which are set to be respectively represented by Formulas (20), (21), (22), and (23):

$$a_{k-1} = -\{(\alpha + 2\beta + 1)/4\}t^3 + \{(2\alpha + 3\beta + 2)/4\}t^2 - \{(\alpha + 1)/4\}t - \beta/4 \tag{20}$$

$$a_k = \{(-\alpha + 6\beta + 7)/4\}t^3 + \{(\alpha - 9\beta - 11)/4\}t^2 + \beta/2 + 1 \tag{21}$$

$$a_{k+1} = \{(\alpha - 6\beta - 7)/4\}t^3 + \{(-2\alpha + 9\beta + 10)/4\}t^2 + \{(\alpha + 1)/4\}t - \beta/4 \tag{22}$$

$$a_{k+2} = \{(\alpha + 2\beta + 1)/4\}t^3 - \{(\alpha + 3\beta + 1)/4\}t^2 \tag{23}$$

in which α and β represent the parameters determining the sharpness of a secondary image represented by the interpolation image signal obtained from the interpolating operation, and t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameters α and β, which determine the sharpness of the secondary image reproduced from the interpolation image signal obtained from the interpolating operation, 3) an interpolation coefficient operation means for calculating the interpolation coefficients $a_{k-1}$, $a_k$, $a_{k+1}$, and $a_{k+2}$ in accordance with the parameters α and β, the calculation being carried out from the interpolation coefficients, which are stored in the storage means, and the parameters α and β inputted from the input means, and 4) an interpolating operation means for storing Formula (1) as the operation formula, and calculating the value of the interpolated image signal component $Y_p$, which corresponds to the interpolation point $X_p$, with Formula (1) in accordance with the interpolation coefficients $a_{k-1}$, $a_k$, $a_{k+1}$, and $a_{k+2}$, which have been calculated by the interpolation coefficient operation means, and the original image signal components $Y_{k-1}$, $Y_k$, $Y_{k+1}$, and $Y_{k+2}$.

The interpolating operation method and apparatus for an image signal in accordance with the present invention have the advantages described below over the conventional interpolating operation method and apparatus, wherein the same interpolating operation process is employed regardless of whether an interpolation point is located at an image edge portion, a flat portion, or the like, in the image. Specifically, the interpolating operation processes, one of which is to be employed for the interpolation point, are changed over to each other in accordance with whether the interpolation point is located at the image edge portion or the flat portion in the image. The interpolating operation process, which is suitable for the image edge portion, is employed for the interpolation point located at the image edge portion. Also, the interpolating operation process, which is suitable for the flat portion, is employed for the interpolation point located at the flat portion. In this manner, a reproduced visible image, which has good image quality as a whole and can serve as an effective tool in, particularly, the accurate and efficient diagnosis of an illness, can be obtained from the interpolation image signal, which has been obtained from the interpolating operation.

For example, in cases where it has been judged that the interpolation point belongs to the image edge portion, the direction, along which the image edge portion extends, is discriminated (i.e., specified). In cases where it has been specified that the image edge portion extends along an oblique direction with respect to the array directions of the sampling points in the unit lattice, the unit lattice is divided into two triangular regions with the image edge portion serving as the boundary between them. Also, the triangular region, which contains the interpolation point therein, is selected from the two triangular regions. The interpolated image signal component corresponding to the interpolation point is calculated from the original image signal components, which represent the three lattice points (i.e., the three sampling points), that constitute the triangular region containing the interpolation point therein. Therefore, the interpolated image signal component corresponding to the interpolation point, which is located at the oblique image edge portion, does not depend upon the original image signal components, which represent the picture elements having markedly different image density values (or luminance values or other kinds of signal values). Accordingly, the problems can be prevented from occurring in that an interpolated point having an intermediate level of image density occurs in a high image density region or a low image density region.

In cases where it has been judged that the interpolation point belongs to the image edge portion, and it has been specified that the image edge portion extends along a direction parallel (or perpendicular) to one of the array directions of the sampling points in the unit lattice, the interpolated image signal component corresponding to the interpolation point is calculated from the original image signal components, which represent the four lattice points (i.e., the four sampling points), that constitute the unit lattice containing the interpolation point therein. In such cases, the calculation of the interpolated image signal component corresponding to the interpolation point, which is located at the image edge portion extending along the direction parallel (or perpendicular) to one of the array directions of the sampling points in the unit lattice, may be carried out by using the same operation process as the conventional one.

In the interpolating operation method and apparatus for an image signal in accordance with the present invention, in cases where it has been judged that the interpolation point belongs to the image edge portion, the image density gradient vector at the interpolation point may be calculated. Also, the distance between the line segment, which intersects perpendicularly to the image density gradient vector, and each of the sampling points, which are located in the vicinity of the interpolation point, may be calculated. The interpolation coefficients may then be corrected such that the interpolation coefficient, by which the original image signal component representing a sampling point is to be multiplied, may become small for the sampling point, for which the image density gradient vector and/or the distance is comparatively large. With the interpolating operation method and apparatus for an image signal in accordance with the present invention, which are constituted in this manner, when the original image signal components representing the sampling points, which are located at positions remote from the line segment (i.e., the image edge portion), are used in the interpolating operation, the degrees of contribution of the original image signal components to the interpolating operation can be kept low. As a result, the degrees of contribution of the original image signal components representing the sampling points, which are located at positions in the vicinity of the image edge portion, i.e. at positions along the image edge portion, to the interpolating operation can be kept relatively high. Therefore, an approximately the same level of image density value (interpolated image signal component) as the image density values of the image edge portion is assigned to the interpolation point, which is located at the image edge portion. Accordingly, the step-like pattern in the original image is not enlarged. Even if the image size is enlarged, the problems can be prevented from occurring in that the step-like pattern at the image edge portion, which extends in the oblique direction, is enlarged.

In cases where it has been judged that the interpolation point belongs to the flat portion in the original image, the interpolating operation process enabling the sharpness to be adjusted, such as the spline interpolating operation process or the interpolating operation process, which comprises the combination of the cubic spline interpolating operation and the third-order B spline interpolating operation, may be carried out by taking the four lattice points (i.e., the four sampling points), that constitute the unit lattice containing the interpolation point therein, as reference and by also using the original image signal components, which represents the sampling points located around the unit lattice. In this manner, the sharpness of the flat portion in the image can be adjusted freely, and a reproduced visible image, which has good image quality and can serve as an effective tool in, particularly, the accurate and efficient diagnosis of an illness, can be obtained.

BRIEF DESCRIPTION OF THE DRAWINGS

FIG. 3 is an explanatory view showing the minimum square lattice having its vertexes at picture elements, which constitute an original image, FIGS. 4A and 4B are explanatory views showing how a unit lattice is divided into two triangular regions, FIG. 6 is a graph showing how sharpness is adjusted, FIGS. 10A, 10B, 10C, and 10D are explanatory views showing further examples of how a direction, along which an image edge portion extends, is specified by using an image density gradient vector, FIGS. 11A, 11B, 11C, and 11D are explanatory views showing still further examples of how a direction, along which an image edge portion extends, is specified by using an image density gradient vector, FIG. 12 is a schematic block diagram showing an image reproducing system provided with an interpolating operation apparatus 30', which is a second embodiment of the interpolating operation apparatus for carrying out the interpolating operation method for an image signal in accordance with the present invention.

DESCRIPTION OF THE PREFERRED EMBODIMENTS

The present invention will hereinbelow be described in further detail with reference to the accompanying drawings.

Figure 1:
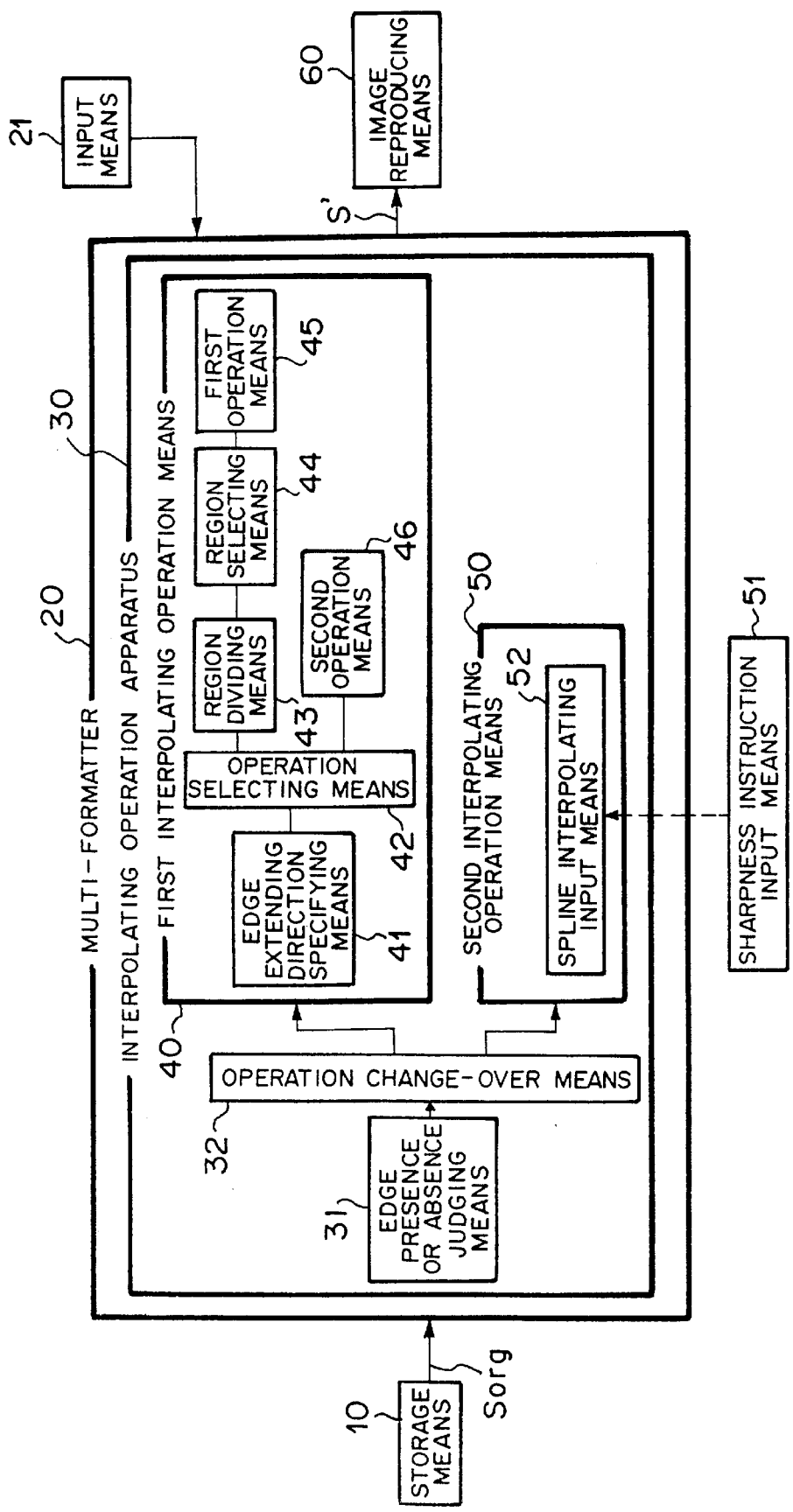
FIG. 1 is a schematic block diagram showing an image reproducing system provided with an interpolating operation apparatus 30, which is a first embodiment of the interpolating operation apparatus for carrying out the interpolating operation method for an image signal in accordance with the present invention.

FIG. 1 is a schematic block diagram showing an image reproducing system provided with an interpolating operation apparatus 30, which is a first embodiment of the interpolating operation apparatus for carrying out the interpolating operation method for an image signal in accordance with the present invention.

With reference to FIG. 1, the image reproducing system comprises a storage means 10 for storing an original image signal Sorg representing an original image, and an input means 21 from which the information representing a desired reproduction format is inputted. The image reproducing system also comprises a multi-formatter 20 for carrying out predetermined signal processing on the original image signal (hereinbelow also referred to as the primary image signal) Sorg, which is received from the storage means 10, such that an image signal conforming to the desired reproduction format, which has been inputted from the input means 21, may be obtained. The image reproducing system further comprises an image reproducing means 60 for reproducing a visible image in the desired reproduction format from the image signal (hereinbelow referred to as the secondary image signal or the interpolation image signal) S', which has been obtained from the predetermined signal processing carried out by the multi-formatter 20.

The multi-formatter 20 carries out the signal processing on the primary image signal Sorg, such that an image signal conforming to one of various image reproduction formats may be obtained. Examples of the image reproduction formats include a format in which the entire area of a single sheet of film is divided into four different small regions and four different images having reduced image sizes are printed respectively in the four regions a format, in which a single large image is printed directly on a single sheet of film and a format, in which a portion of an image is enlarged and the enlarged image portion is printed on a sheet of film. The multi-formatter 20 is provided with the interpolating operation apparatus 30 in accordance with the present invention, which carries out an interpolating operation for obtaining the secondary image signal made up of a number of image signal components different from that of the image signal components of the primary image signal Sorg when the image size is to be enlarged or reduced.

Figure 2A:
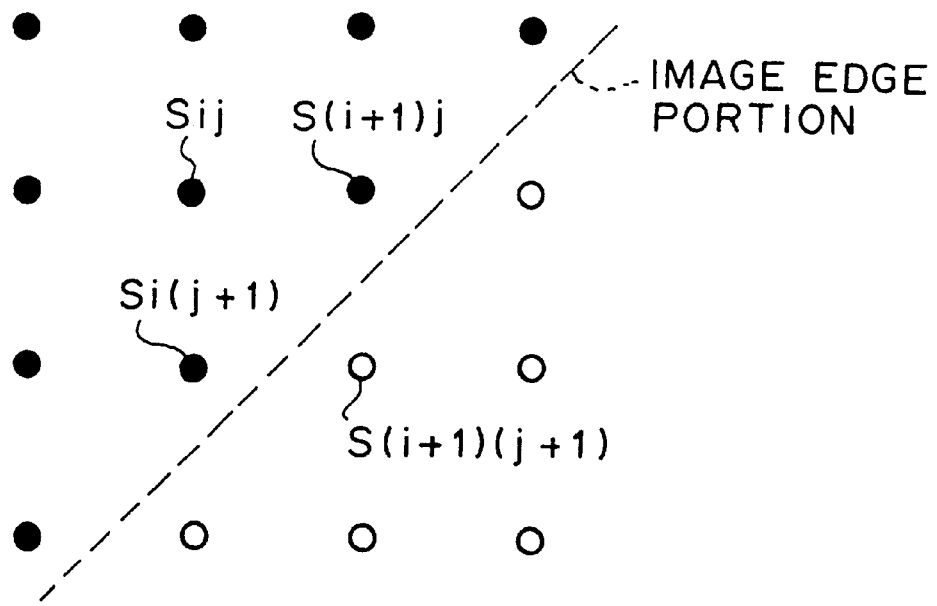
FIGS. 2A and 2B are explanatory views showing picture elements, which constitute an original image.

As illustrated in FIG. 2A, the primary image signal Sorg utilized in this embodiment represents the image composed of picture elements (i.e., the lattice points indicated by white dots and black dots), which are arrayed in the horizontal and vertical directions in the lattice-like form. In the image, an image edge portion, at which the change in the image density (i.e., the value of the primary image signal Sorg) is sharp, extends along an oblique direction inclined upwardly to the right with respect to the array directions of the picture elements. In FIG. 2A, the picture elements having a high image density are indicated by the black dots, and the picture elements having a low image density are indicated by the white dots.

The interpolating operation apparatus 30 sets an interpolation point on the original image and in accordance with the image size enlargement or reduction scale factor, which has been inputted from the input means 21. The interpolating operation apparatus 30 comprises an edge presence or absence judging means 31 for making a judgment as to whether the interpolation point belongs to an image edge portion or a flat portion in the original image. The interpolating operation apparatus 30 also comprises a first interpolating operation means 40, which is used for an interpolation point belonging to the image edge portion and calculates the secondary image signal component corresponding to the interpolation point, and a second interpolating operation means 50, which is used for an interpolation point belonging to the flat portion and calculates the secondary image signal component corresponding to the interpolation point. The interpolating operation apparatus 30 further comprises an operation change-over means 32 for changing the first interpolating operation means 40 and the second interpolating operation means 50 over to each other in accordance with the results of the judgment having been made by the edge presence or absence judging means 31.

The first interpolating operation means 40 comprises an edge extending direction specifying means 41 for discriminating (i.e., specifying) the direction, along which the image edge portion extends, with respect to the array directions of the sampling points (i.e., the picture elements of the original image, which will often be referred to as the lattice points) in a unit lattice. The first interpolating operation means 40 also comprises a region dividing means 43 for dividing the unit lattice into two triangular regions with the image edge portion serving as the boundary therebetween, the image edge portion extending along an oblique direction with respect to the array directions of the sampling points in the unit lattice, and a region selecting means 44 for selecting a triangular region, which contains the interpolation point therein, from the two triangular regions. The first interpolating operation means 40 further comprises a first operation means 45 for calculating the secondary image signal component of the secondary image signal S' corresponding to the interpolation point, the calculation being made from the primary image signal components of the primary image signal Sorg, which represent the three sampling points, that constitute the triangular region containing the interpolation point therein. The first interpolating operation means 40 still further comprises a second operation means 46 for calculating the secondary image signal component of the secondary image signal S' corresponding to the interpolation point, the calculation being made from the primary image signal components of the primary image signal Sorg, which represent the four lattice points, that constitute the unit lattice containing the interpolation point therein. The first interpolating operation means 40 also comprises an operation selecting means 42 for selecting either one of the first operation means 45 and the 46 in accordance with the results of the specifying carried out by the edge extending direction specifying means 41.

In cases where, as a result of the specifying carried out by the edge extending direction specifying means 41, it has been specified that the image edge portion extends along an oblique direction with respect to the array directions of the sampling points in the unit lattice, the operation selecting means 42 selects the region dividing means 43 such that the first operation means 45 may be used. In cases where, as a result of the specifying carried out by the edge extending direction specifying means 41, it has been specified that the image edge portion extends along a direction parallel to one of the array directions of the sampling points in the unit lattice, the operation selecting means 42 selects the second operation means 46 such that the second operation means 46 may be used.

The first operation means 45 stores the information representing the algorithms of a predetermined interpolating operation, which will be described later. The first operation means 45 carries out the interpolating operation with the algorithms on the received primary image signal Sorg and thereby calculates the secondary image signal S'.

The second interpolating operation means 50 comprises a sharpness instruction input means 51 for inputting an instruction concerning the alteration of sharpness of the flat portion from the exterior. The second interpolating operation means 50 also comprises a spline interpolating operation means 52, with which the sharpness of the flat portion is capable of being altered in accordance with the instruction inputted from the sharpness instruction input means 51.

The spline interpolating operation means 52 stores the information representing an interpolating operation formula, which will be described later and is expressed with a polynomial of interpolation coefficients in accordance with the sharpness specified from the sharpness instruction input means 51.

How the image reproducing system provided with this embodiment operates will be described hereinbelow.

Firstly, information representing a desired image size enlargement scale factor is inputted from the input means 21 into the multi-formatter 20.

The multi-formatter 20 sequentially reads the primary image signal Sorg (=Sij, where i, j=1, 2, . . . ), which represents the picture elements illustrated in FIG. 2A, from the storage means 10.

Also, in order to obtain the secondary image signal, which represents an enlarged image corresponding to the image size enlargement scale factor inputted from the input means 21, the multi-formatter 20 feeds the primary image signal Sorg into the interpolating operation apparatus 30.

In the interpolating operation apparatus 30, the primary image signal Sorg is firstly fed into the edge presence or absence judging means 31. From the received primary image signal Sij, the edge presence or absence judging means 31 calculates the differences among image signal components Sij, S(i+1)j, Si(j+1), and S(i+1)(j+1), which represent the lattice points of the minimum square lattice. Specifically, calculations are made to find differences |Sij−S(i+1)j|, |Sij−Si(j+1)|, |Sij−S(i+1)(j+1)|, |S(i+1)j−Si(j+1)|, |S(i+1)j−S(i+1)(j+1)|, and |Si(j+1)−S(i+1)(j+1)|. A large difference value indicates that a portion, at which the change in the image density is sharp, i.e. the image edge portion, is located between the two lattice points associated with the difference value. The edge presence or absence judging means 31 carries out the calculation with respect to each of the square lattices represented by the primary image signal Sij and thereby makes a judgment as to the presence or absence of the image edge portion.

In the example taken in this embodiment, the values of |Sij−S(i+1)j|, |Sij−Si(j+1)|, and |S(i+1)j−Si(j+1)| are approximately equal to zero. Also, the values of |Sij−S(i+1)(j+1)|, |S(i+1)j−S(i+1)(j+1)|, and |Si(j+1)−S(i+1)(j+1)| take a certain large value. Therefore, it is judged that the image edge portion is present.

However, if the presence or absence of the image edge portion is judged from these calculated difference values alone, there will be the risk that a granular portion representing radiation noise, or the like, are detected by mistake as the image edge portion. In order for such problems to be eliminated, as illustrated in FIG. 3, after the calculation has been made with respect to the unit lattice containing the interpolation point therein, the same calculation may also be carried out with respect to unit lattices b, c, d, and e, which are located around the unit lattice a. The thus calculated values may then be utilized in making the judgment. The setting of the unit lattices around the unit lattice, which contains the interpolation point therein, and the setting of the sampling points may be carried out in various ways.

Alternatively, an image density gradient vector with respect to each of two array directions of the sampling points may be calculated from the original image signal components representing the four sampling points, which constitute the unit lattice containing the interpolation point therein. A judgment as to the presence or absence of the image edge portion may then be made from the magnitude and the product of the two calculated image density gradient a vectors.

The information representing the results of the judgment having been made by the edge presence or absence judging means 31 is fed into the operation change-over means 32. In cases where it has been judged that the image edge portion is present, the operation change-over means 32 changes the interpolating operation means over to the first interpolating operation means 40. In cases where it has been judged that the image edge portion is absent, the operation change-over means 32 changes the interpolating operation means over to the second interpolating operation means 50.

In cases where it has been judged that the image edge portion is present, the image reproducing system provided with this embodiment operates in the manner described below.

Specifically, the primary image signal Sorg is fed into the first interpolating operation means 40. In the first interpolating operation means 40, as in the edge presence or absence judging means 31, the edge extending direction specifying means 41 calculates the differences among the image signal components Sij, S(i+1)j, Si(j+1), and S(i+1)(j+1), which represent the lattice points of the minimum square lattice, from the received primary image signal Sij. Specifically, calculations are made to find the differences |Sij−S(i+1)j|, |Sij−Si(j+1)|, |Sij−S(i+1)(j+1)|, |S(i+1)j−Si(j+1)|, |S(i+1)j−S(i+1)(j+1)|, and |Si(j+1)−S(i+1)(j+1)|. From the calculated difference values, the edge extending direction specifying means 41 specifies the direction, along which the image edge portion extends.

In the example of FIG. 2A, the values of |Sij−S(i+1)(j+1)|, |S(i+1)j−S(i+1)(j+1)|, and |Si(j+1)−S(i+1)(j+1)| take a certain large value. Also, the values of |Sij−S(i+1)j|, |Sij−Si(j+1)|, and |S(i+1)j−Si(j+1)| are not large. Therefore, it can be specified that the image edge portion extends along the oblique direction inclined upwardly to the right with respect to the array directions of the sampling points.

In cases where the values of |Sij−S(i+1)j| and |Si(j+1)−S(i+1)(j+1)| take a small value and, at the same time, the values of |Sij−Si(j+1)| and |S(i+1)j−S(i+1)(j+1)| take a large value, it is specified that the image edge portion extends along the horizontal direction. In cases where the values of |Sij−Si(j+1)| and |S(i+1)j−S(i+1)(j+1)| take a small value and, at the same time, the values of |Sij−S(i+1)j| and |Si(j+1)−S(i+1)(j+1)| take a large value, it is specified that the image edge portion extends along the vertical direction.

As in making the judgment as to the presence or absence of the image edge portion, after the calculation has been made with respect to the unit lattice containing the interpolation point therein, the same calculation may also be carried out with respect to the unit lattices b, c, d, and e, which are located around the unit lattice a. The thus calculated values may then be utilized in specifying the direction, along which the image edge portion extends. Alternatively, the image density gradient vector with respect to each of two array directions of the sampling points may be calculated from the original image signal components representing the four sampling points, which constitute the unit lattice containing the interpolation point therein. The direction, along which the image edge portion extends, may then be specified from the magnitude and the product of the two calculated image density gradient vectors.

How the direction, along which the image edge portion extends, is specified from the magnitude and the product of the image density gradient vectors will be described hereinbelow.

An image density gradient vector I with respect to an array direction i of the sampling points in the unit lattice containing the interpolation point therein and an image density gradient vector J with respect to an array direction j of the sampling points in the unit lattice containing the interpolation point therein can be calculated with the formulas shown below.

$$I(=\vec{I})=[\{S_{(i+1)(j+1)}+S_{(i+1)j}\}-\{S_{i(j+1)}+S_{ij}\}]\vec{i}$$

$$J(=\vec{J})=[\{S_{(i+1)(j+1)}+S_{i(j+1)}\}-\{S_{(i+1)j}+S_{ij}\}]\vec{j}$$

wherein each of $\vec{i}$ and $\vec{j}$ represents the unit vector in the array direction of the sampling points.

The magnitude |I| of the image density gradient vector I and the magnitude |J| of the image density gradient vector J are taken into consideration, and the difference (|I|−|J|) between them is compared with a predetermined threshold value T1, where T1>0, and a predetermined threshold value −T1. From the results of the comparison, the direction, along which the image edge portion extends, with respect to the array directions of the sampling points in the unit lattice can be specified.

Specifically, the direction, along which the image edge portion extends, can be specified in the manner described below.

(a) If (|I|−|J|)>T1, it can be specified that the image edge portion is a vertical image edge portion.

(b) If (|I|−|J|)<−T1, it can be specified that the image edge portion is a horizontal image edge portion.

(c) If −T1<(|I|−|J|)<T1, it can be specified that the image edge portion is an oblique image edge portion.

The term "vertical image edge portion" as used herein means the image edge portion extending in the direction parallel to the direction, that connects the sampling points Sij and Si(j+1) with each other. The term "horizontal image edge portion" as used herein means the image edge portion extending in the direction parallel to the direction, that connects the sampling points Sij and S(i+1)j with each other. The term "oblique image edge portion" as used herein means the image edge portion extending in the direction parallel to the direction, that connects the sampling points Sij and S(i+1)(j+1) with each other, or that connects the sampling points Si(j+1) and S(i+1)j with each other.

As for the oblique image edge portion, in order for its direction to be specified, the product of the two image density gradient vectors I and J is compared with a predetermined threshold value T2, where T2>0, and a predetermined threshold value −T2. From the results of the comparison, it is specified along which diagonal direction of the unit lattice the image edge portion extends. The product is calculated with the formula shown below.

$$\vec{I} \times \vec{J} = [\{S_{(i+1)(j+1)} + S_{(i+1)j}\} - \{S_{i(j+1)} + S_{ij}\}] \times$$
$$[\{S_{(i+1)(j+1)} + S_{i(j+1)}\} - \{S_{(i+1)j} + S_{ij}\}]$$

Specifically, the direction of the oblique image edge portion is specified in the manner described below.

(d) If $[\{S(i+1)j+S(i+1)(j+1)\}-\{Sij+Si(j+1)\}]\times[\{Si(j+1)+S(i+1)(j+1)\}-\{Sij+S(i+1)j\}]>T2$, it can be specified that the oblique image edge portion is inclined upwardly to the right as illustrated in FIGS. 9A, 9B, 9C, and 9D.

(e) If $[\{S(i+1)j+S(i+1)(j+1)\}-\{Sij+Si(j+1)\}]\times[\{Si(j+1)+S(i+1)(j+1)\}-\{Sij+S(i+1)j\}]<-T2$, it can be specified that the oblique image edge portion is inclined upwardly to the left as illustrated in FIGS. 10A, 10B, 10C, and 10D.

(f) If $-T2<[\{S(i+1)j+S(i+1)(j+1)\}-\{Sij+Si(j+1)\}]\times[\{Si(j+1)+S(i+1)(j+1)\}-\{Sij+S(i+1)j\}]<T2$, the direction of the oblique image edge portion can be specified as follows:

if Sij>S(i+1)j, it can be specified that the oblique image edge portion is inclined upwardly to the right as illustrated in FIG. 11A, and if Sij<S(i+1)j, it can be specified that the oblique image edge portion is inclined upwardly to the left as illustrated in FIG. 11B.

In this manner, since the discrimination of the direction, along which the image edge portion extends, is difficult, the direction connecting the diagonal sampling points, which have a low image density, with each other is preferentially taken as the edge extending direction such that, in cases where the image is a character pattern, importance may be attached to the connection of the character pattern. In the cases of (f), if the values of Sij and S(i+1)j are approximately equal to each other, it can be considered that, as illustrated in FIGS. 11C and 11D, the four sampling points constituting the unit lattice have approximately uniform image density. Therefore, in such cases, it can be specified that the image edge portion is not present in the image constituted by the unit lattice.

In a modification of this embodiment, the edge presence or absence judging means 31 may also have the functions of the edge extending direction specifying means 41 and may specify the edge extending direction when making the judgment as to the presence or absence of the image edge portion. In such cases, the edge extending direction specifying means 41 may be omitted.

The information representing the results of the specifying of the direction, along which the image edge portion extends, is fed into the operation selecting means 42. In cases where it has been specified that the direction, along which the image edge portion extends, is the oblique direction, the operation selecting means 42 selects the region dividing means 43, which is connected to the first operation means 45. In cases where it has been specified that the direction, along which the image edge portion extends, is the vertical direction or the horizontal direction, the operation selecting means 42 selects the second operation means 46. The operation selecting means 42 feeds the primary image signal Sorg to the selected means, i.e. the region dividing means 43 or the second operation means 46.

Figure 2B:
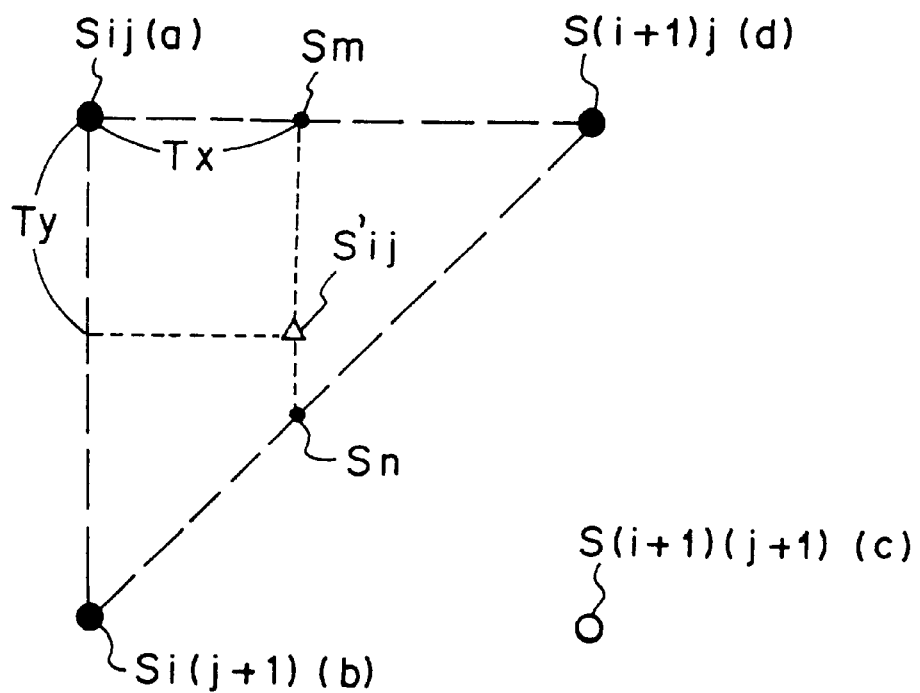

In cases where it has been specified that the direction, along which the image edge portion extends, is the oblique direction, as illustrated in FIG. 2B, the region dividing means 43 divides the unit lattice, which is composed of the sampling points a, b, c, and d and contains an interpolation point S'ij therein, into two triangular regions (Δabd and Δbcd) by the diagonal line connecting the two lattice points b and d, that are adjacent to each other along the direction, along which the image edge portion extends (in this example, the oblique direction inclined upwardly to the right).

Thereafter, the region selecting means 44 selects the triangular region (in the example of FIG. 2B, Δabd), which contains the interpolation point S'ij therein, from the thus divided two triangular regions. In cases where the interpolation point S'ij lies on the diagonal line (b~d), along which the unit lattice is divided, the region selecting means 44 compares the image density value (i.e., the value of the primary image signal Sorg) of the lattice point (a), which is other than the two lattice points (b, d) lying on the diagonal line among the three lattice points (a, b, d) constituting the triangular region (Δabd), and the image density values of the two lattice points (b, d) lying on the diagonal line. Also, the region selecting means 44 compares the image density value of the lattice point (c), which is other than the two lattice points (b, d) lying on the diagonal line among the three lattice points (b, c, d) constituting the triangular region (Δbcd), and the image density values of the two lattice points (b, d) lying on the diagonal line. The region selecting means 44 then selects the triangular region (in this example, Δ abd) containing the lattice point (a), the image density value of which is closer to the image density values of the two lattice points (b, d) lying on the diagonal line than the image density value of the lattice point (c) is.

The region selecting means 44 extracts (i.e., selects) the three lattice points (a, b, d), which constitute the selected triangular region (Δabd).

In general, as illustrated in FIGS. 4A and 4B, a set of the primary image signal components, which represent the three lattice points corresponding to the vertexes of one of triangular regions 1, 2, 3, and 4, is extracted (selected) in accordance with the direction, along which the image edge portion extends, and the position of the interpolation point. For example, in cases where the interpolation point is located within the triangular region 1, which has a side extending along the oblique direction inclined upwardly to the right, the lattice points a, b, and d are extracted. In cases where the interpolation point is located within the triangular region 3, which has a side extending along the oblique direction inclined upwardly to the left, the lattice points a, b, and c are extracted.

The primary image signal components Sij, S(i+1)j, and Si(j+1) representing the thus extracted lattice points Sij, S(i+1)j, and Si(j+1) are fed into the first operation means 45. The first operation means 45 calculates the secondary image signal component S'ij, which corresponds to the interpolation point S'ij, from the three received primary image signal components Sij, S(i+1)j, and Si(j+1)

The algorithms for the calculation of the secondary image signal component S'ij will hereinbelow be described in detail with reference to FIG. 2B.

The interval between the lattice points Sij and S(i+1)j and the interval between the lattice points Sij and Si(j+1) are respectively taken as being equal to the unit length of 1. Also, as illustrated in FIG. 2B, the distance between the lattice point Sij and the interpolation point S'ij, the distance being taken along the x axis direction (i.e., the horizontal direction), is represented by Tx. The distance between the lattice point Sij and the interpolation point S'ij, the distance being taken along the y axis direction (i.e., the vertical direction), is represented by Ty. In such cases, an image signal component Sm corresponding to a virtual interpolation point Sm, that corresponds to the position of the interpolation point S'ij taken from the lattice point Sij along the x axis direction, is calculated with the linear interpolating operation represented by Formula (31) shown below. Also, an image signal component Sn corresponding to a virtual interpolation point Sn, that corresponds to the position of the interpolation point S'ij taken on the line connecting the lattice points S(i+1)j and Si(j+1) with each other (i.e., the line in the direction, along which the image edge portion extends), is calculated with the linear interpolating operation represented by Formula (32) shown below.

$$Sm=(1-Tx)Sij+TxS(i+1)j \quad (31)$$

$$Sn=(1-Tx)Si(j+1)+TxS(i+1)j \quad (32)$$

Thereafter, a linear interpolating operation is carried out for the interpolation point S'ij and with respect to the y axis direction by using the image signal components Sm and Sn, and the secondary image signal component S'ij is thereby calculated. The linear interpolating operation is represented by Formula (33) shown below.

$$S'ij = (1 - Tx - Ty)Sij + TySi(j+1) + TxS(i+1)j \quad (33)$$

The secondary image signal component S'ij, which corresponds to the interpolation point S'ij and has been calculated with Formula (33) is not affected by the lattice point S(i+1)(j+1), which is located at the position crossing the image edge portion and has a markedly different image density value. Therefore, even if the interpolation point lies on the image edge portion, the secondary image signal component corresponding to the interpolation point will depend upon only the primary image signal components Si(j+1) and S(i+1)j representing the lattice points, which are located along the direction, along which the image edge portion extends. Accordingly, the problems do not occur in that an interpolated point having a markedly different signal value occurs on the image edge portion.

The calculation of the secondary image signal component S'ij with Formula (33) is the one for the cases where the interpolation point is located within the triangular region 1 shown in FIG. 4A. In cases where the interpolation point is located within one of the other triangular regions 2, 3, and 4 shown in FIGS. 4A and 4B, the secondary image signal component can be calculated in the same manner.

Specifically, in cases where the interpolation point is located within the triangular region 2, the secondary image signal component S'ij corresponding to the interpolation point can be calculated with Formula (34) shown below.

$$S'ij = (1 - Tx)Si(j+1) + (1 - Ty)S(i+1)j + (Tx + Ty - 1)S(i+1)(j+1) \quad (34)$$

In cases where the interpolation point is located within the triangular region 3, the secondary image signal component S'ij corresponding to the interpolation point can be calculated with Formula (35) shown below.

$$S'ij = (1 - Ty)Sij + (Ty - Tx)Si(j+1) + TxS(i+1)(j+1) \quad (35)$$

In cases where the interpolation point is located within the triangular region 4, the secondary image signal component S'ij corresponding to the interpolation point can be calculated with Formula (36) shown below.

$$S'ij = (1 - Tx)Sij + (Tx - Ty)S(i+1)j + TyS(i+1)(j+1) \quad (36)$$

The first operation means 45 stores the information representing Formulas (33), (34), (35), and (36). The first operation means 45 selects the calculation formula, which is to be used, from Formulas (33), (34), (35), and (36) in accordance with the primary image signal components, which represent the lattice points having been extracted by the region selecting means 44. Also, the first operation means 45 calculates the secondary image signal component S'ij, which corresponds to the interpolation point, by using the selected calculation formula.

In cases where it has been specified that the direction, along which the image edge portion extends, is the vertical direction or the horizontal direction, the second operation means 46 is selected, and the primary image signal Sorg is fed into the second operation means 46.

The second operation means 46 carries out a known interpolating operation on the image signal components Sij, S(i+1)j, Si(j+1), and S(i+1)(j+1) representing the four lattice points a, b, c, and d, which constitute the unit lattice containing the interpolation point S'ij therein. In this manner, the second operation means 46 calculates the image signal component of the interpolation image signal S' corresponding to the interpolation point S'.

Figure 5A:
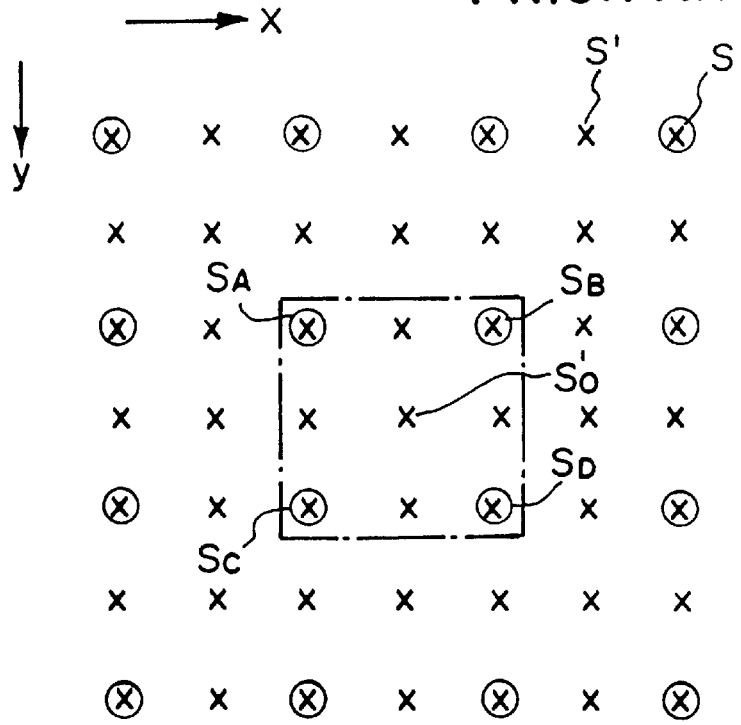
FIGS. 5A and 5B are explanatory views showing how a conventional interpolating operation is carried out.
Figure 5B:
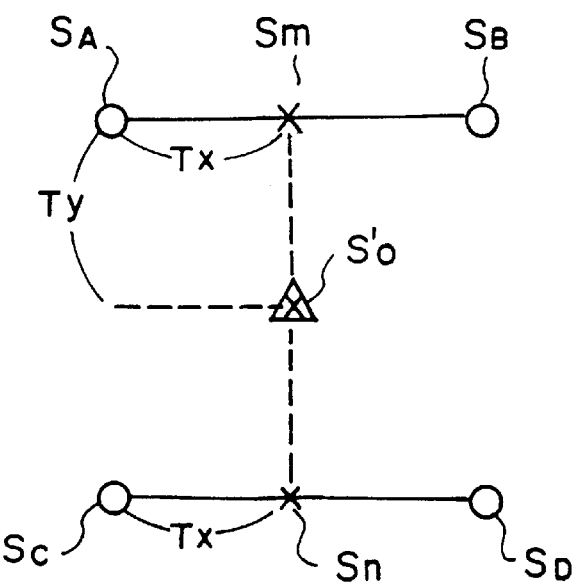
Figure 7A:
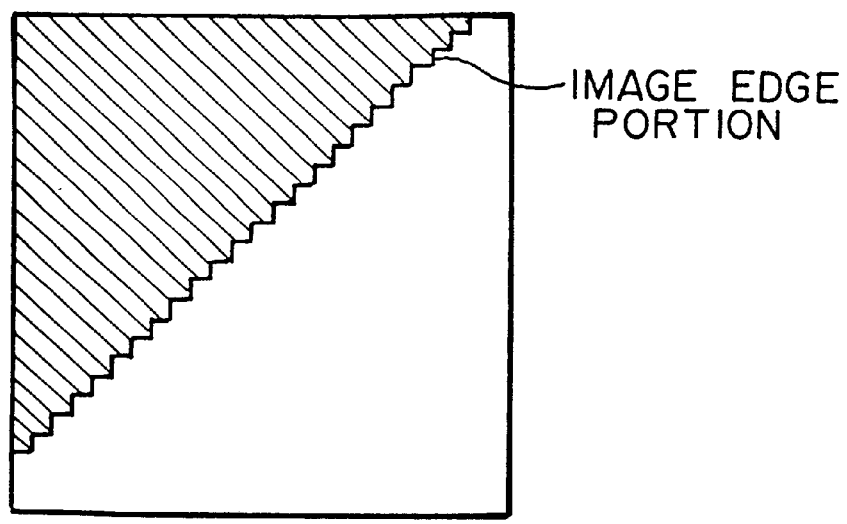
FIGS. 7A and 7B are explanatory views respectively showing an original image and picture elements, which constitute the original image, the views serving as an aid in explaining how the conventional interpolating operation is carried out.
Figure 7B:
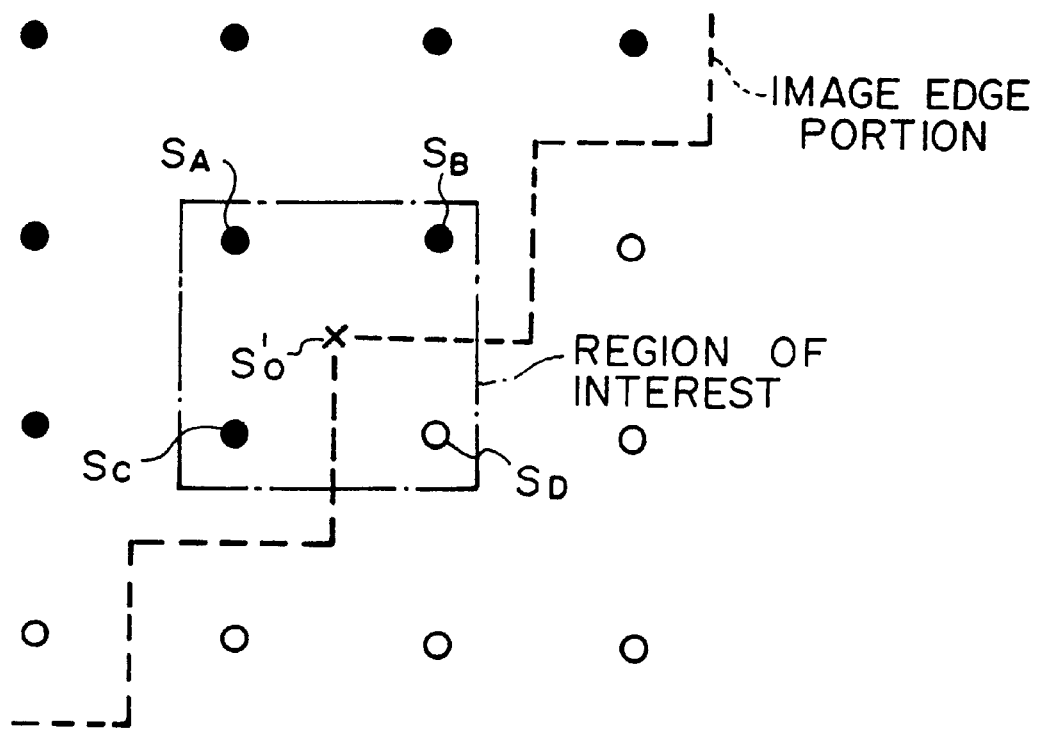
Figure 8A:
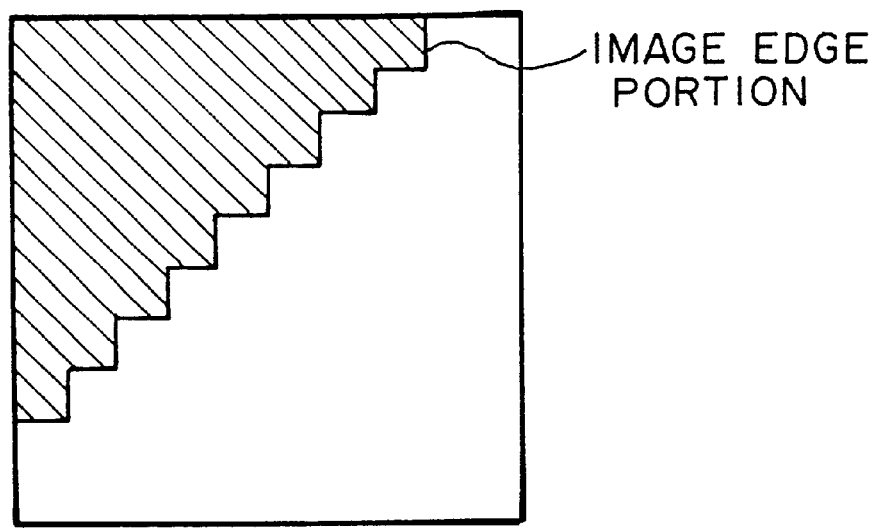
FIG. 8A is an explanatory view showing an interpolation image obtained from the conventional interpolating operation.
Figure 8B:
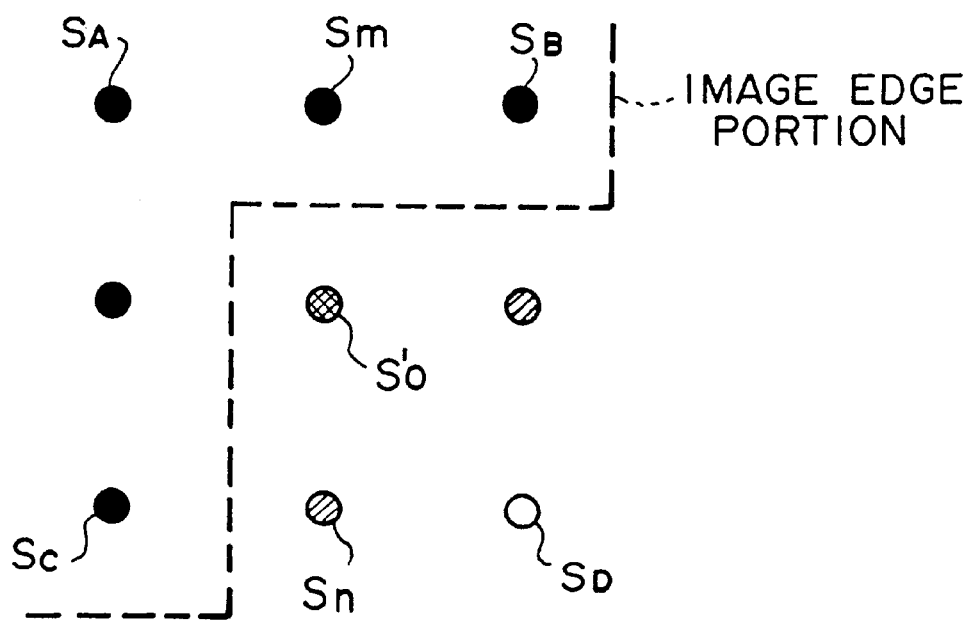
FIG. 8B is an explanatory view showing picture elements, which constitute the interpolation image of FIG. 8A obtained from the conventional interpolating operation.
Figure 9A:
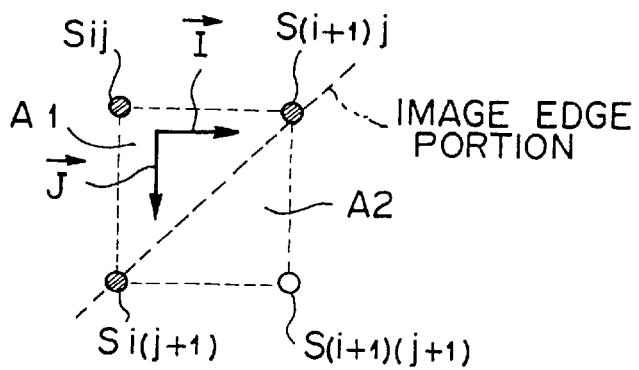
FIGS. 9A, 9B, 9C, and 9D are explanatory views showing examples of how a direction, along which an image edge portion extends, is specified by using an image density gradient vector.
Figure 9B:
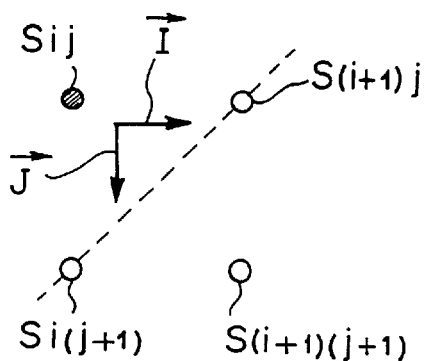
Figure 9C:
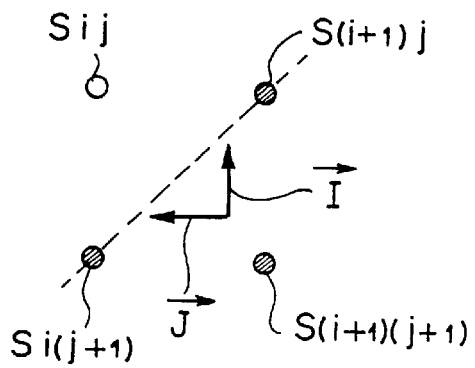
Figure 9D:
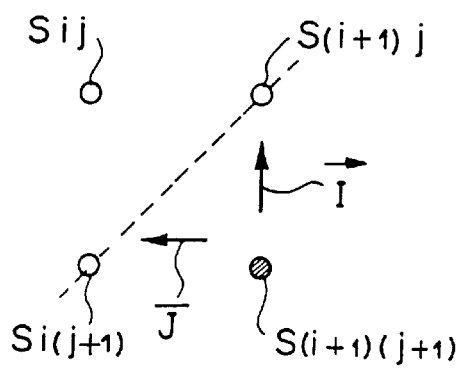

Specifically, as illustrated in FIG. 5B, the interpolated image signal components Sm and Sn, which respectively correspond to the interpolation points Sm and Sn, that correspond to the positions of the interpolation point S'ij taken along the x axis direction, are calculated with linear interpolating operations represented by Formulas (31) and (37) shown below.

$$Sm=(1-Tx)Sij+TxS(i+1)j \quad (31)$$

$$Sn=(1-Tx)Si(j+1)+TxS(i+1)(j+1) \quad (37)$$

Thereafter, a linear interpolating operation is carried out for the interpolation point S'ij and with respect to the y axis direction by using the interpolated image signal components Sm and Sn, and the secondary image signal component S'ij is thereby calculated. The linear interpolating operation is represented by Formula (30) shown below.

$$S'ij=(1-Ty)Sm+TySn \quad (30)$$

The same operations as those described above are also carried out for the other interpolation points, and the corresponding image signal components of the interpolated image signal S' are thereby obtained.

In cases where the direction, along which the image edge portion extends, is the vertical direction or the horizontal direction, even if the interpolating operation depending upon the original image signal components representing the four lattice points described above is carried out, an interpolation point having a markedly different signal value does not occur on the image edge portion.

In cases where it has been judged by the edge presence or absence judging means 31 that the image edge portion is absent, the processing described below is carried out.

In such cases, the operation change-over means 32 receives the results of the judgment having been made by the edge presence or absence judging means 31 and changes the interpolating operation means over to the second interpolating operation means 50. The primary image signal Sorg is fed into the spline interpolating operation means 52.

The spline interpolating operation means 52 stores a third-order spline interpolating operation formula, e.g. Formula (1) shown below, and formulas for calculating interpolation coefficients, e.g. Formulas (8), (9), (10), and (11) shown below, which are set in accordance with the sharpness. The spline interpolating operation means 52 calculates the secondary image signal S' in accordance with the received primary image signal Sorg by using these formulas.

$$S'=a_{k-1}S_{k-1}+a_kS_k+a_{k+1}S_{k+1}+a_{k+2}S_{k+2} \tag{1}$$

$$a_{k-1}=-(\alpha/2)t(t-1)^2 \tag{8}$$

$$a_k=(2-\alpha/2)t^3-(3-\alpha/2)t^2+1 \tag{9}$$

$$a_{k+1}=(\alpha/2-2)t^3+(3-\alpha)t^2+(\alpha/2)t \tag{10}$$

$$a_{k+2}=(\alpha/2)t^2(t-1) \tag{11}$$

in which α represents the parameter determining the sharpness of a secondary image represented by the interpolation image signal obtained from the interpolating operation, and t, where $0 \leq t < 1$, represents the position of the interpolation point $X_s'$, the position being taken with respect to the picture element $X_k$, that serves as a reference position, and in the direction heading toward the picture element $X_{k+1}$, the lattice interval of the primary image signal components being set to be equal to 1.

How the spline interpolating operation means 52 carries out the interpolating operation will hereinbelow be described in detail.

As an aid in facilitating the explanation, as illustrated in FIG. 6, of the picture elements of the original image represented by the primary image signal Sorg, only the picture elements $X_{k-2}, X_{k-1}, X_k, X_{k+1}, X_{k+2}, \ldots$, which are arrayed along a single predetermined direction, e.g. along the j'th row in the array of the picture elements, are considered.

The primary image signal components representing the picture elements $X_{k-2}, X_{k-1}, X_k, X_{k+1}, X_{k+2}, \ldots$ are represented respectively by $S_{k-2}$ {=S(i-2)j}, $S_{k-1}$ {=S(i-1)j}, Sk {=Sij}, $S_{k+1}$ {=S(i+1)j}, $S_{k+2}$ {=S(i+2)j}, . . . .

Firstly, in cases where the interpolation point $X_s'$ falls within a section $X_k \sim X_{k+1}$, a spline interpolating function $f_k$ corresponding to the section $X_k \sim X_{k+1}$ is represented by Formula (38) shown below.

$$f_k(X)=A_kX^3+B_kX^2+C_kX+D_k \tag{38}$$

In the operation formula, Formula (38), the conditions should be satisfied in that the spline interpolating function $f_k$ should pass through the original sampling points (picture elements), and in that the first-order differential coefficient of the spline interpolating function $f_k$ should be continuous between adjacent sections. From such conditions, Formulas (2), (3), (4), and (5) are derived.

$$f_k(X_k)=S_k \tag{2}$$

$$f_k(X_{k+1})=S_{k+1} \tag{3}$$

$$f_k'(X_k)=f_{k-1}'(X_k) \tag{4}$$

$$f_k'(X_k)=f_{k+1}'(X_{k+1}) \tag{5}$$

In these formulas, $f_k'$ represents the first-order differentiation $(3A_kx^2+2B_kx+C_k)$ of the function $f_k$.

Also, the condition should be satisfied in that the first-order differential coefficient of the spline interpolating function $f_k$ at the picture element $X_k$ should have a predetermined inclination a with respect to the gradient $(S_{k+1}-S_{k-1})/(X_{k+1}-X_{k-1})$ of the original image signal components $S_{k-1}$ and $S_{k+1}$ representing the picture elements $X_{k-1}$ and $X_{k+1}$, which are located before and after the picture element $X_k$. Therefore, it is necessary for Formula (6) shown below to be satisfied:

$$f_k'(X_k)=\alpha(S_{k+1}-S_{k-1})/(X_{k+1}-X_{k-1}) \tag{6}$$

Further, the condition should be satisfied in that the first-order differential coefficient of the spline interpolating function $f_k$ at the picture element $X_{k+1}$ should have the predetermined inclination α with respect to the gradient $(S_{k+2}-S_k)/(X_{k+2}-X_k)$ of the original image signal components $S_k$ and $S_{k+2}$ representing the picture elements $X_k$ and $X_{k+2}$, which are located before and after the picture element $X_{k+1}$. Therefore, it is necessary for Formula (7) shown below to be satisfied:

$$f_k'(X_{k+1})=\alpha(S_{k+2}-S_k)/(X_{k+2}-X_k) \tag{7}$$

The interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is herein set to be equal to 1. Also, the position of the interpolation point $X_s'$, which is taken from the picture element $X_k$ in the direction heading toward the picture element $X_{k+1}$, is represented by t (0<t<1). In such cases, from Formulas (2), (3), (4), (5), (6), and (7), the formulas shown below obtain.

$$f_k(0)=D_k=S_k$$

$$f_k(1)=A_k+B_k+C_k+D_k=S_{k+1}$$

$$f_k'(0)=C_k=\alpha(S_{k+1}-S_{k-1})/2$$

$$f_k'(1)=3A_k+2B_k+C_k=\alpha(S_{k+2}-S_k)/2$$

Therefore, the formulas shown below obtain.

$$A_k = (\alpha/2)S_{k+2} + (\alpha/2 - 2)S_{k+1} + (2 - \alpha/2)S_k - (\alpha/2)S_{k-1}$$

$$B_k = -(\alpha/2)S_{k+2} + (3 - \alpha)S_{k+1} + (\alpha/2 - 3)S_k + \alpha S_{k-1}$$

$$C_k = (\alpha/2)S_{k+1} - (\alpha/2)S_{k-1}$$

$$D_k = S_k$$

As described above, the variable conversion of X=t is carried out, and therefore the spline interpolating function $f_k(x)$ is represented by the formula shown below.

$$f_k(x)=f_k(t)$$

Therefore, the image signal component of the secondary image signal S' corresponding to the interpolation point $X_s'$ may be represented by Formula (39) shown below.

$$S'=f_k(t)=A_kt^3+B_kt^2+C_kt+D_k \tag{39}$$

Substituting the coefficients $A_k$, $B_k$, $C_k$, and $D_k$ into Formula (39) yields $$S' = \{(\alpha/2)S_{k+2} + (\alpha/2 - 2)S_{k+1} + (2 - \alpha/2)S_k - (\alpha/2)S_{k-1}\}t^3 +$$
$$\{-(\alpha/2)S_{k+2} + (3 - \alpha)S_{k+1} + (\alpha/2 - 3)S_k + \alpha S_{k-1}\}t^2 +$$
$$\{(\alpha/2)S_{k+1} - (\alpha/2)S_{k-1}\}t + S_k$$

Arranging this formula with respect to the image signal components $S_{k-1}$, $S_k$, $S_{k+1}$, and $S_{k+2}$ yields Formula (40) shown below.

$$S' = \{\alpha t(t-1)^2/2\}S_{k-1} + \{(2-\alpha/2)t^3 + (\alpha/2-3)t^2 + 1\}S_k + \quad (40)$$
$$\{(\alpha/2-2)t^3 + (3-\alpha)t^2 + \alpha t/2\}S_{k+1} +$$
$$\{-\alpha t^2(t-1)/2\}S_{k+2}$$

The interpolation coefficients $a_{k-1}$, $a_k$, $a_{k+1}$, and $a_{k+2}$ corresponding to the original image signal components $S_{k-1}$, $S_k$, $S_{k+1}$, and $S_{k+2}$ are calculated with the algorithms described above.

As will be understood from Formulas (6) and (7) and FIG. 6, as the value of the parameter α is set to be larger, the contrast of the secondary image becomes higher, and an image having a higher sharpness is obtained. As the value of the parameter α is set to be smaller, the contrast of the secondary image becomes lower, and a smoother image having a lower sharpness is obtained. Therefore, the sharpness of the flat portion can be adjusted freely by inputting the instruction for the alteration of the parameter α from the sharpness instruction input means 51. The input of the instruction for the alteration of the parameter α includes the input of the instruction for increasing or reducing the parameter α and the direct input of the value of the parameter α.

An actual image is composed of the picture elements arrayed in two-dimensional directions. Therefore, the parameter t, which is used in the aforesaid interpolation coefficient formulas, may be replaced by $t_x$ with respect to one of the two directions in the array and may be replaced by $t_y$ with respect to the other direction in the array. The interpolation coefficients may thus be determined for each of the directions in the array. The spline interpolating operation means 52 stores the information representing the thus set interpolation coefficients.

The thus obtained secondary image signal S' corresponding to all of the interpolation points is fed into the image reproducing means 60.

The image reproducing means 60 reproduces a visible image from the received secondary image signal S'. As described above, in cases where the interpolation point belongs to the image edge portion and the direction, along which the image edge portion extends, is an oblique direction with respect to the array directions of the sampling points in the unit lattice, the interpolated image signal component corresponding to the interpolation point is calculated from the primary image signal components, which represent the three lattice points constituting a predetermined triangular region. As a result, the interpolated image signal component corresponding to the interpolation point located at the oblique image edge portion does not depend upon the primary image signal component, which represents the lattice point having a markedly different image density value. Therefore, in the reproduced visible image, an interpolated point having an intermediate level of image density does not occur in a high image density region or a low image density region.

In cases where the interpolation point belongs to the image edge portion and the direction, along which the image edge portion extends, is parallel to one of the array directions of the sampling points in the unit lattice, the interpolated image signal component corresponding to the interpolation point is calculated from the primary image signal components, which represent the four lattice points (sampling points) constituting the unit lattice, to which the interpolation point belongs. In this manner, the interpolated image signal component corresponding to the interpolation point, which is located at the image edge portion extending in the horizontal or vertical direction, can be calculated with the same interpolating operation process as the conventional one.

In the spline interpolating operation means 52, in lieu of the algorithms described above, Formulas (1), (16), (17), (18), and (19) shown below may be utilized in order to set the interpolation coefficients $a_{k-1}$, $a_k$, $a_{k+1}$, and $a_{k+2}$ corresponding to the original image signal components $S_{k-1}$, $S_k$, $S_{k+1}$, and $S_{k+2}$.

$$S' = a_{k-1}S_{k-1} + a_k S_k + a_{k+1}S_{k+1} + a_{k+2}S_{k+2} \quad (1)$$
$$a_{k-1} = -(\beta+1/2)t^3 + (3\beta/2+1)t^2 - (1/2)t - \beta/2 \quad (16)$$
$$a_k = 3(\beta+1/2)t^3 - (9\beta/2+5/2)t^2 + \beta + 1 \quad (17)$$
$$a_{k+1} = -3(\beta+1/2)t^3 + (9\beta/2+2)t^2 + (1/2)t - \beta/2 \quad (18)$$
$$a_{k+2} = (\beta+1/2)t^3 - (3\beta/2+1/2)t^2 \quad (19)$$

In these formulas, as in α, β represents the parameter determining the sharpness of the secondary image represented by the interpolation image signal obtained from the interpolating operation. However, α is the value concerning the image density gradient at the interpolation point, and β is the value representing the amount of shift (the difference in signal value) of the interpolation point from the sampling points. Specifically, in the interpolating operation process utilizing β, the interpolation point need not pass through the sampling points in the original image, and therefore the sampling points do not necessarily constitute part of the interpolation points. Accordingly, by the control of the shift amount, the sharpness of the interpolation image can be adjusted.

As different examples of the algorithms, the interpolation coefficients $a_{k+1}$, $a_k$, $a_{k+1}$, and $a_{k+2}$ corresponding to the original image signal components $S_{k-1}$, $S_k$, $S_{k+1}$, and $S_{k+2}$ may be set in accordance with Formulas (1), (20), (21), (22), and (23) shown below, in which both of the control of the sharpness with the parameter α and the control of the sharpness with the parameter β are utilized.

$$S' = a_{k-1}S_{k-1} + a_k S_k + a_{k+1}S_{k+1} + a_{k+2}S_{k+2} \quad (1)$$
$$a_{k-1} = -\{(\alpha+2\beta+1)/4\}t^3 + \{(2\alpha+3\beta+2)/4\}t^2 - \quad (20)$$
$$\{(\alpha+1)/4\}t - \beta/4$$
$$a_k = \{(-\alpha+6\beta+7)/4\}t^3 + \{(\alpha-9\beta-11)/4\}t^2 + \beta/2 + 1 \quad (21)$$
$$a_{k+1} = \{(\alpha-6\beta-7)/4\}t^3 + \{(-2\alpha+9\beta+10)/4\}t^2 + \quad (22)$$
$$\{(\alpha+1)/4\}t - \beta/4$$
$$a_{k+2} = \{(\alpha+2\beta+1)/4\}t^3 - \{(\alpha+3\beta+1)/4\}t^2 \quad (23)$$

In such cases, the sharpness of the flat portion in the interpolation image can be adjusted freely by changing the values of the parameter α and the parameter β.

As described above, with this embodiment of the interpolating operation apparatus, in cases where the interpolation point is located at the image edge portion, three or four sampling points appropriate for the calculation of the secondary image signal component corresponding to the interpolation point are selected, and the secondary image signal component is calculated from the original image signal components representing the selected sampling points. Therefore, a markedly different signal value is not given to the interpolation point, which is located at the image edge portion. Accordingly, a step-like pattern is not enlarged at the oblique image edge portion.

In cases where the interpolation point is located at the flat portion, the interpolated image signal component corresponding to the interpolation point is calculated with the ordinary cubic spline interpolating operation and from the image signal components representing the surrounding lattice points, which constitute the unit lattice containing the interpolation point therein. The image is reproduced from the thus obtained interpolation image signal. When necessary, the instruction for the alteration of the sharpness can be inputted by the person, who views the image, and the sharpness of the flat portion can thereby be adjusted. Accordingly, a visible image having good image quality can be reproduced from the interpolation image signal and used as an effective tool in, particularly, the accurate and efficient diagnosis of an illness.

A second embodiment of the interpolating operation apparatus for carrying out the interpolating operation method for an image signal in accordance with the present invention will be described hereinbelow.

FIG. 12 is a schematic block diagram showing an image reproducing system provided with an interpolating operation apparatus 30', which is the second embodiment of the interpolating operation apparatus for carrying out the interpolating operation method for an image signal in accordance with the present invention. The interpolating operation apparatus 30' illustrated in FIG. 12 is the same as the interpolating operation apparatus 30 illustrated in FIG. 1, except for a first interpolating operation means 40' and a second interpolating operation means 50'. In the interpolating operation apparatus 30' illustrated in FIG. 12, the first interpolating operation means 40' comprises an interpolation coefficient calculating means 41' for calculating each of interpolation coefficients, by which the corresponding one of the original image signal components is to be multiplied, from the original image signal components of the primary image signal Sorg, which represent four sampling points located in the vicinity of the interpolation point (ordinarily, the four lattice points constituting the unit lattice). The first interpolating operation means 40' also comprises an image density gradient vector and distance calculating means 42' for calculating an image density gradient vector at the interpolation point on the original image, which is represented by the original image signal components, and calculating the distance between a line segment, which intersects perpendicularly to the image density gradient vector, and each of the sampling points (the original picture elements) utilized in the interpolating operation. The first interpolating operation means 40' further comprises a correction term calculating means 43' for calculating a correction term for correcting the interpolation coefficients, which have been calculated by the interpolation coefficient calculating means 41', in accordance with the magnitude of the image density gradient vector and/or the length of the distance between the line segment, which intersects perpendicularly to the image density gradient vector, and each of the original picture elements utilized in the interpolating operation, the image density gradient vector and the distance having been calculated by the image density gradient vector and distance calculating means 42'. The first interpolating operation means 40' still further comprises a correction means 44' for correcting the interpolation coefficients, which have been calculated by the interpolation coefficient calculating means 41', with respect to the correction term, which has been calculated by the correction term calculating means 43', such that the interpolation coefficient may become small for a sampling point, for which the image density gradient vector and/or the distance is comparatively large. The first interpolating operation means 40' also comprises an operation processing means 45' for multiplying the original image signal component by the corresponding interpolation coefficient, which has been corrected by the correction means 44'. In the interpolation coefficient calculating means 41', the interpolation coefficients may be calculated with, for example, the cubic spline interpolating operation. With the cubic spline interpolating operation, the interpolation coefficients $a_{k-1}$, $a_k$, $a_{k+1}$, and $a_{k+2}$ are calculated with the formulas shown below, which are obtained by setting a to be equal to 1 in Formulas (8), (9), (10), and (11) shown above.

$$a_{k-1}=-t(t-1)^2/2$$

$$a_k=(3t^3-5t^2+2)/2$$

$$a_{k+1}=(-3t^3+4t^2+t)/2$$

$$a_{k+2}=t^2(t-1)/2$$

Also, in the interpolating operation apparatus 30' illustrated in FIG. 12, the second interpolating operation means 50' comprises a cubic spline interpolation coefficient storing means 52', a B spline interpolation coefficient storing means 51', an interpolation coefficient operation means 53', and an interpolating operation means 54'.

The cubic spline interpolation coefficient storing means 52' stores information representing interpolation coefficients $c_{k-1}$, $c_k$, $c_{k+1}$, and $c_{k+2}$ in the cubic spline interpolating operation, which are represented by the formulas shown below.

$$c_{k-1}=-t(t-1)^2/2$$

$$c_k=(3t^3-5t^2+2)/2$$

$$c_{k+1}=(-3t^3+4t^2+t)/2$$

$$c_{k+2}=t^2(t-1)/2$$

The B spline interpolation coefficient storing means 51' stores information representing interpolation coefficients $b_{k-1}$, $b_k$, $b_{k+1}$, and $b_{k+2}$ in the third-order B spline interpolating operation, which are represented by the formulas shown below.

$$b_{k-1}=(-t^3+3t^2-3t+1)/6$$

$$b_k=(3t^3-6t^2+4)/6$$

$$b^{k+1}=(-3t^3+3t^2+3t+1)/6$$

$$b_{k+2}=t^3/6$$

The interpolation coefficient operation means 53' receives the interpolation coefficients (hereinbelow referred to as the cubic spline interpolation coefficients) $c_{k-1}$, $c_k$, $c_{k+1}$, and $c_{k+2}$ from the cubic spline interpolation coefficient storing means 52' and receives the interpolation coefficients (hereinbelow referred to as the B spline interpolation coefficients) $b_{k-1}$, $b_k$, $b_{k+1}$, and $b_{k+2}$ from the B spline interpolation coefficient storing means 51'. The interpolation coefficient operation means 53' carries out the linear combination of the cubic spline interpolation coefficients $c_{k-1}$, $c_k$, $c_{k+1}$, and $c_{k+2}$ and the B spline interpolation coefficients $b_{k-1}$, $b_k$, $b_{k+1}$, and $b_{k+2}$, which coefficients correspond to each other and are set for the respective original image signal components $S_{k-1}$, $S_k$, $S_{k+1}$, and $S_{k+2}$. The linear combination is carried out with Formulas (46), (47), (48), and (49) shown below and in accordance with a weight factor $\alpha$, which is inputted from the sharpness instruction input means 51.

$$a_{k-1} = (1-\alpha)c_{k-1} + \alpha b_{k-1} \quad (46)$$
$$= \{(2\alpha-3)t^3 - (3\alpha-6)t^2 - 3t + \alpha\}/6$$

$$a_k = (1-\alpha)c_k + \alpha b_k \quad (47)$$
$$= \{(9-6\alpha)t^3 + (9\alpha-15)t^2 + (6-2\alpha)\}/6$$

$$a_{k+1} = (1-\alpha)c_{k+1} + \alpha b_{k+1} \quad (48)$$
$$= \{(6\alpha-9)t^3 - (9\alpha-12)t^2 + 3t + \alpha\}/6$$

$$a_{k+2} = (1-\alpha)c_{k+2} + \alpha b_{k+2} \quad (49)$$
$$= \{(3-2\alpha)t^3 + (3\alpha-3)t^2\}/6$$

The interpolating operation means 54' stores the information representing Formula (1) shown above as the operation formula with the spline interpolating function. The interpolating operation means 54' calculates the value of the interpolated image signal component S', which corresponds to the interpolation point S', with Formula (1). The calculation is made from the interpolation coefficients $a_{k-1}$, $a_k$, $a_{k+1}$, and $a_{k+2}$ according to the parameter $\alpha$, which have been calculated by the interpolation coefficient operation means 53', and the original image signal components $S_{k-1}$, $S_k$, $S_{k+1}$, and $S_{k+2}$.

The parameter $\alpha$ can take all real numbers, including the range more than 1 and the range less than 0.

In cases where it has been judged by the edge presence or absence judging means 31 that the image edge portion is present, the image reproducing system provided with this embodiment operates in the manner described below.

Specifically, the primary image signal Sorg is fed from the storage means 10 into the interpolation coefficient calculating means 41' and the image density gradient vector and distance calculating means 42'. The interpolation coefficient calculating means 41' calculates the interpolation coefficients $a_{k-1}$, $a_k$, $a_{k+1}$, and $a_{k+2}$ with the formulas shown below in accordance with the aforesaid cubic spline interpolating operation.

$$a_{k-1} = -t(t-1)^2/2$$

$$a_k = (3t^3 - 5t_2 + 2)/2$$

$$a_{k+1} = (-3t^3 + 4t^2 + t)/2$$

$$a_{k+2} = t^2(t-1)/2$$

An actual original image is composed of the picture elements arrayed in two-dimensional directions. Therefore, the parameter t, which is used in the aforesaid interpolation coefficient formulas, may be replaced by $t_x$ with respect to one of the two directions in the array and may be replaced by $t_y$ with respect to the other direction in the array. The interpolation coefficients are thus determined for each of the directions in the array.

Figure 13:
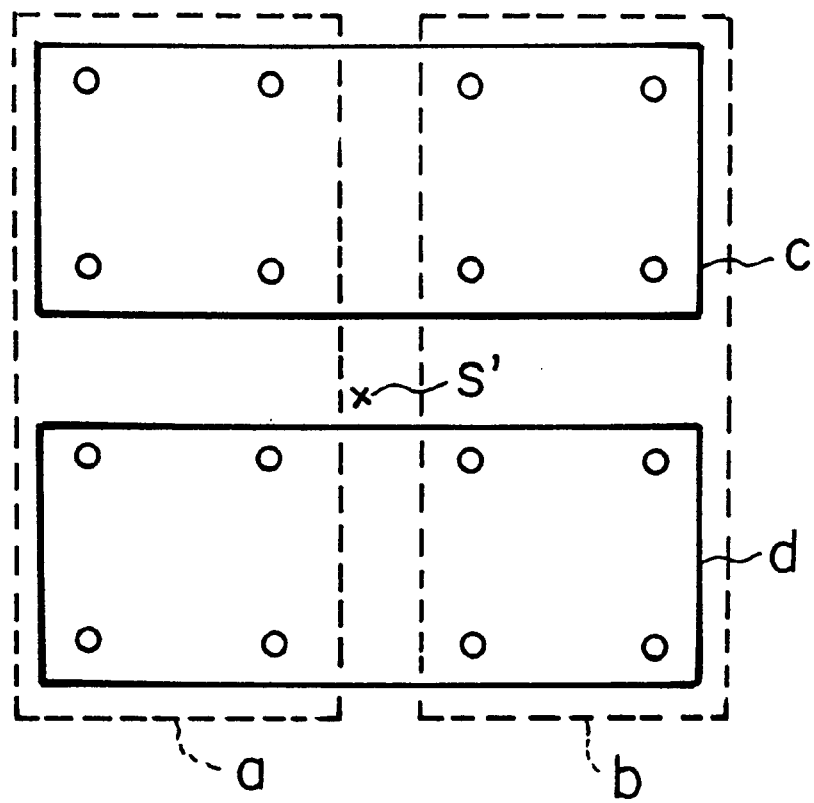
FIG. 13 is an explanatory view showing an example of how an image density gradient vector is calculated.

The image density gradient vector and distance calculating means 42' calculates the image density gradient vector at the interpolation point and the distance between the line segment, which intersects perpendicularly to the image density gradient vector, and each of the sampling points, which are represented by the original image signal components and are utilized in the interpolating operation. Specifically, as illustrated in FIG. 13, 16 sampling points located in the vicinity of the interpolation point S', for which the interpolated image signal component S' is to be calculated, are grouped into four regions a, b, c, and d. The total sum Wa of the original image signal components in the region a is calculated. Also, the total sums Wb, Wc, and Wd of the original image signal components in the regions b, c, and d are respectively calculated. From the total sums Wa, Wb, Wc, and Wd, an image density gradient vector $S_v$ is calculated with the formula shown below.

$$S_v = (Wb - Wa, Wd - Wc)$$

Figure 14:
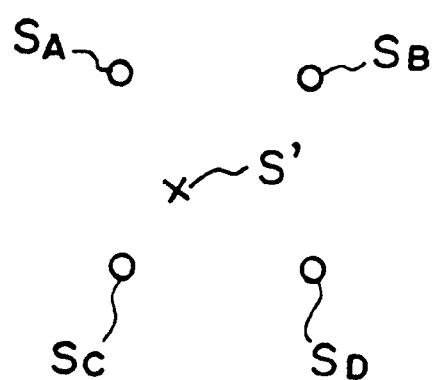
FIG. 14 is an explanatory view showing a different example of how an image density gradient vector is calculated.

Alternatively, as illustrated in FIG. 14, the image density gradient vector $S_v$ may be calculated with the formula shown below from the original image signal components $S_A$, $S_B$, $S_C$, and $S_D$, which represent the four sampling points $S_A$, $S_B$, $S_C$, and $S_D$ located in the vicinity of the interpolation point S', for which the interpolated image signal component S' is to be calculated.

$$S_v = ((S_B + S_D) - (S_A + S_C), (S_C + S_D) - (S_A + S_B))$$

Figure 15:
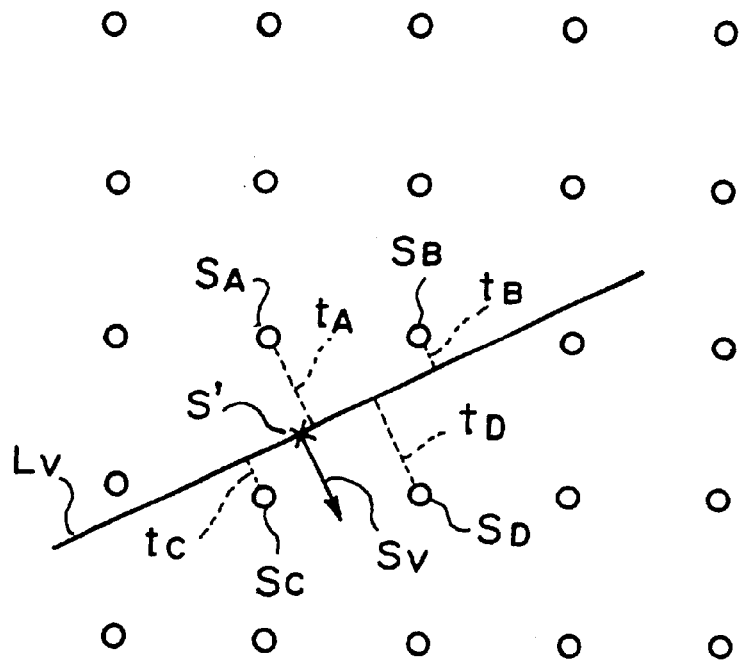
FIG. 15 is an explanatory view showing an image density gradient vector, a line segment intersecting perpendicularly to the image density gradient vector, and distances between the line segment and sampling points.

After the image density gradient vector $S_v$ has thus been calculated, as illustrated in FIG. 15, a line segment $L_v$, which intersects perpendicularly to the image density gradient vector $S_v$, is determined. In the calculation of the interpolated image signal component S' corresponding to the interpolation point S', the original image signal components $S_A$, $S_B$, $S_C$, and $S_D$, which represent the four sampling points $S_A$, $S_B$, $S_C$, and $S_D$ located in the vicinity of the interpolation point S', are respectively multiplied by the corresponding interpolation coefficients $a_A$, $a_B$, $a_C$, and $a_D$. In this embodiment, the interpolation coefficients $a_A$, $a_B$, $a_C$, and $a_D$, by which the corresponding original image signal components $S_A$, $S_B$, $S_C$, and $S_D$ are multiplied, are corrected in accordance with the magnitude of the image density gradient vector $S_v$ and the distances from the line segment $L_v$ to the sampling points $S_A$, $S_B$, $S_C$, and $S_D$. The correction is carried out in the manner described below.

The coordinate values of a sampling point shown in FIG. 15 are represented by (u, v), and the interpolation coefficient corresponding to the sampling point having the coordinates (u, v) is represented by $a_{u,v}$. Also, the coordinate values of the interpolation point S' are represented by (dx, dy), and the image density gradient vector $S_v$ is represented by (Sx, Sy). In such cases, a corrected interpolation coefficient $a'_{u,v}$ is calculated with Formula (41) shown below.

$$a'_{u,v} = a_{u,v}/\{k \cdot f(S_v, t) + 1\} \quad (41)$$

wherein k represents a fixed number, and $f(S_v, t)$ is the correction term and represents (image density gradient vector $S_v$)×{distance from the perpendicularly intersecting line segment $L_v$ to coordinates (u, v)}.

Specifically, the calculation with Formula (41) is carried out in the manner described below.

Firstly, the correction term calculating means 43' calculates the magnitude $|S_v|$ of the image density gradient vector (Sx, Sy) having been calculated by the image density gradient vector and distance calculating means 42'. The calculation is made with Formula (42) shown below.

$$|S_v| = (Sx^2 + Sy^2)^{1/2} \quad (42)$$

Thereafter, a calculation is made to find the distance t between the line segment $L_v$, which passes through the interpolation point S' having the coordinates (dx, dy) and intersects perpendicularly to the image density gradient vector $S_v$, and each sampling point having the coordinates (u, v). The calculation is made with Formula (43) shown below.

$$t = |Sx(u-dx) + Sy(v-dy)|/(Sx^2 + Sy^2)^{1/2} \quad (43)$$

Therefore, the correction term $f(S_v, t)$ is represented by Formula (44) shown below.

$$f(S_v, t) = |Sx(u-dx) + Sy(v-dy)| \quad (44)$$

In the correction means 44', the interpolation coefficient is corrected by using the correction term f(S$_v$, t), which has been calculated by the correction term calculating means 43'. Specifically, Formula (44) is substituted into Formula (41), and Formula (41') shown below is thereby obtained.

$$a'_{u,v} = a_{u,v} / \{k \cdot |Sx(u-dx) + Sy(v-dy)| + 1\} \quad (41')$$

The processing for correcting the interpolation coefficient $a_{u,v}$ is carried out for the four original picture elements $S_A$, $S_B$, $S_C$, and $S_D$ located in the vicinity of the interpolation point S', and four corrected interpolation coefficients $a'_{u,v}$ are thereby obtained. The corrected interpolation coefficients $a'_{u,v}$ having thus been obtained are normalized, and ultimate interpolation coefficients ($a'_{u,v}/\Sigma a'_{ij}$) are thereby obtained.

The ultimate interpolation coefficients ($a'_{u,v}/\Sigma a'_{ij}$) having thus been obtained are corrected such that the value of the interpolation coefficient may become smaller than the original interpolation coefficient as the inclination of the image density gradient vector $S_v$ at the interpolation picture element S', for which the interpolated image signal component is to be calculated, becomes large and as the distance from the line segment, which intersects perpendicularly to the image density gradient vector $S_v$ becomes large.

The information representing the ultimately obtained interpolation coefficients ($a'_{u,v}/\Sigma a'_{ij}$) is fed into the operation processing means 45'. The operation processing means 45' calculates the interpolated image signal component S' from the ultimately obtained interpolation coefficients $a'_A$, $a'_B$, $a'_C$, and $a'_D$ for each interpolation point and the corresponding original image signal components $S_A$, $S_B$, $S_C$, and $S_D$. The calculation is made with Formula (45) shown below.

$$S' = a'_A \cdot S_A + a'_B \cdot S_B + a'_C \cdot S_C + a'_D \cdot S_D \quad (45)$$

In the interpolation image signal S' comprising the interpolated image signal components S', which have been obtained in this manner, the effects of the original image signal components representing the original picture elements located at positions remote from the image edge portion, at which the image density gradient vector $S_v$ is comparatively large, in the original image have been reduced. Therefore, in the obtained interpolation image, a step-like pattern does not occur even at the image edge portion extending along the oblique direction. Accordingly, by the image reproducing means 60, an interpolation image can be reproduced which has a smooth and sharp image edge portion.

In cases where it has been judged by the edge presence or absence judging means 31 that the image edge portion is absent, the processing described below is carried out.

Firstly, the primary image signal Sorg is fed from the storage means 10 into the interpolating operation means 54' of the second interpolating operation means 50'.

In the second interpolating operation means 50', the B spline interpolation coefficient storing means 51' and the cubic spline interpolation coefficient storing means 52' set the values of t in the respective interpolation coefficients in accordance with the image size enlargement scale factor having been inputted from the input means 21. For example, in cases where an image size enlargement scale factor of 2 is inputted, values of 0.5 and 1.0 are set as the values of t. In cases where an image size enlargement scale factor of 4 is inputted, values of 0.25, 0.5, 0.75, and 1.0 are set as the values of t. In cases where an image size enlargement scale factor of 10 is inputted, values of 0.1, 0.2, ..., 1.0 are set as the values of t. Information representing the B spline interpolation coefficients and the cubic spline interpolation coefficients, which are for each of the thus set values of t, is fed into the interpolation coefficient operation means 53'.

Also, information representing a value of the parameter (i.e., the factor) $\alpha$ corresponding to a level of sharpness desired for the secondary image is inputted from the sharpness instruction input means 51 into the interpolation coefficient operation means 53'.

The information representing the value of the parameter $\alpha$ may be directly inputted by the operator. Alternatively, information representing a response R, which corresponds to the level of sharpness desired for the interpolation image, may be inputted by the operator, and a look-up table for converting the response R into the corresponding parameter $\alpha$ may be provided. For such purposes, for example, the constitution of an input means described with reference to FIG. 3 in EP 753 828 A2, which has been filed by the applicant, may be employed. In cases where the sharpness is specified in accordance with the response R, the extent of the change in the sharpness can be grasped as an actual feeling.

The information representing the parameter a, which has been inputted directly or has been calculated from the inputted response R, is fed into the interpolation coefficient operation means 53'.

The interpolation coefficient operation means 53' calculates the new interpolation coefficients $a_{k-1}$, $a_k$, $a_{k+1}$, and $a_{k+2}$ for each of the values of t according to the value of the parameter $\alpha$ from the received B spline interpolation coefficients and the received cubic spline interpolation coefficients, which are for each of the values of t, and the parameter $\alpha$. The calculations are carried out with Formulas (46), (47), (48), and (49).

The information representing the calculated new interpolation coefficients $a_{k-1}$, $a_k$, $a_{k+1}$, and $a_{k+2}$ is fed into the interpolating operation means 54'.

The interpolating operation means 54' calculates the value of the interpolated image signal component S', which corresponds to the interpolation point S', with Formula (1), which is stored therein and serves as the operation formula with the third-order spline interpolating function, in accordance with the interpolation coefficients $a_{k-1}$, $a_k$, $a_{k+1}$, and $a_{k+2}$, which have been received from the interpolation coefficient operation means 53', and the received original image signal components $S_{k-1}$, $S_k$, $S_{k+1}$, and $S_{k+2}$.

The thus obtained interpolation image signal S' containing the interpolated image signal components, which correspond to all interpolation points, is fed into the image reproducing means 60. The image reproducing means 60 reproduces a visible image from the received interpolation image signal S'. The sharpness of the reproduced visible image can be adjusted easily by merely changing the value of the inputted parameter $\alpha$. In cases where a negative value less than 0 is inputted as the value of the parameter $\alpha$, an image having a sharpness higher than the sharpness of the secondary image, which is obtained with the ordinary cubic spline interpolating operation, can be obtained. In cases where a value larger than 1 is inputted as the value of the parameter $\alpha$, a smooth image having a sharpness lower than the sharpness of the secondary image, which is obtained with the ordinary B spline interpolating operation, can be obtained. Also, in cases where the parameter $\alpha$ is set to be equal to a value larger than 0 and smaller than 1, an image having a sharpness, which is intermediate between the sharpness of the secondary image obtained with the cubic spline interpolating operation and the sharpness of the secondary image obtained with the B spline interpolating operation, can be obtained.

In the second interpolating operation means 50' employed in this embodiment, the sharpness of the interpolation image is rendered variable by the combination of the B spline interpolating operation and the cubic spline interpolating operation. However, the interpolating operation method for an image signal in accordance with the present invention is not limited to the combination of the B spline interpolating operation and the cubic spline interpolating operation, and various combinations of two interpolating functions yielding different levels of sharpness may be employed. For example, various interpolating operation functions, such as the B spline interpolating operation function, the cubic spline interpolating operation function, a linear interpolating function, and a Lagrangean interpolating operation function, may be used, and an arbitrary combination of two of these functions may be employed.

Figure 16:
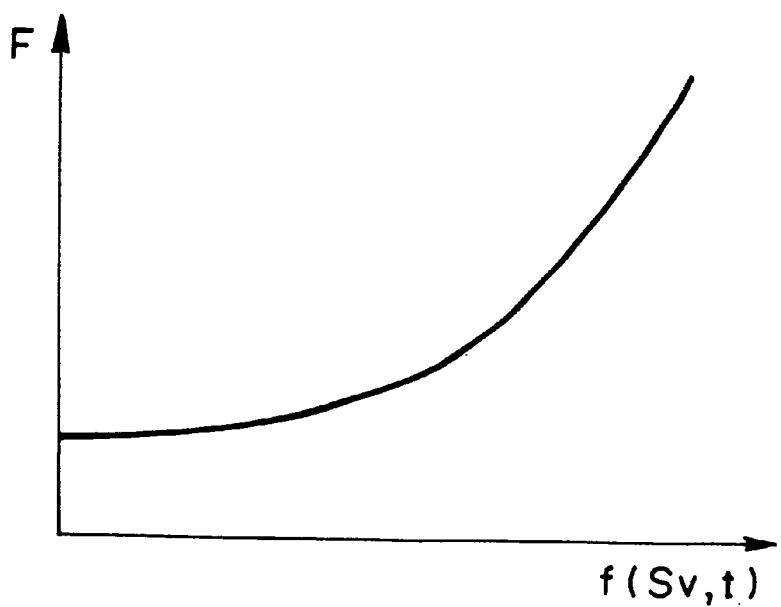
FIG. 16 is a graph showing an example of a correction term.

Also, in the first interpolating operation means 40' employed in this embodiment, the interpolation coefficient is corrected in accordance with Formula (41). Alternatively, the interpolation coefficient may be corrected in accordance with Formula (50) shown below.

$$a'_{u,v} = a_{u,v} / \{F(S_v, t)\} \tag{50}$$

wherein $F(S_v, t)$ is a function as illustrated in FIG. 16, the value of which increases monotonously as the value of $f(S_v, t)$ increases.

Further, in the first interpolating operation means 40' employed in this embodiment, the interpolating operation is carried out in accordance with the cubic spline interpolating operation. However, the interpolating operation method for an image signal in accordance with the present invention is not limited to the cubic spline interpolating operation, and the interpolating operation may be carried out in accordance with the B spline interpolating operation. In the B spline interpolating operation, the spline interpolating function need not pass through the original sampling points (picture elements), and it is necessary that the first-order differential coefficient and the second-order differential coefficient of the spline interpolating function are continuous between adjacent sections. Under such conditions, the interpolation coefficients $b_{k-1}$, $b_k$, $b_{k+1}$, and $b_{k+2}$ in the B spline interpolating operation, which correspond to the original image signal components $S_{k-1}$, $S_k$, $S_{k+1}$, and $S_{k+2}$, may be calculated with the operation as described above.

For the original image signal components $S_{k-1}$, $S_k$, $S_{k+1}$, and $S_{k+2}$, it is also possible to employ the interpolation coefficients, which are obtained by weighting the B spline interpolation coefficients and the cubic spline interpolation coefficients in accordance with Formulas (46), (47), (48), and (49) shown above. Also, the interpolating operation may be carried out with the linear interpolation.

In the image reproducing systems provided with the aforesaid embodiments, the interpolating operation apparatus 30 or the interpolating operation apparatus 30' utilizes the primary image signal having been previously stored in the storage means 10. However, the interpolating operation apparatus in accordance with the present invention is not limited to these embodiments. For example, an image signal representing an image, which has been detected by using a predetermined image read-out apparatus, may be directly fed from the image read-out apparatus into the interpolating operation apparatus 30 or the interpolating operation apparatus 30'.

What is claimed is:

1. An interpolating operation method for an image signal, wherein an interpolated image signal component corresponding to an interpolation point is calculated from original image signal components of an original image signal representing an original image, which represent a plurality of sampling points arrived at predetermined intervals and in a lattice-like form, the method comprising the steps of:

i) making a judgment as to whether the interpolation point belongs to an image edge portion, at which a change in the original image signal is sharp, or belongs to a flat portion, at which the change in the original image signal is unsharp, and ii) changing interpolating operation processes, one of which is to be employed for the interpolation point, over to each other in accordance with the judgment; and wherein the interpolating operation process, which is employed in cases where, as a result of said judgment, it has been judged that the interpolation point belongs to the image edge portion, is an interpolating operation process comprising the steps of:

a) specifying a direction, along which the image edge portion extends, with respect to the array of the sampling points in a unit lattice, and b) changing selection processes for selecting the original image signal components, from which the interpolated image signal component corresponding to the interpolation point is to be calculated in accordance with said direction, along which the image edge portion extends.

2. A method as defined in claim 1 wherein said direction, along which the image edge portion extends, is specified by:

grouping each of two sets of sampling points, each set being constituted of two sampling points, which are located at two diagonal positions facing each other in the unit lattice, that contains the interpolation point therein, calculating the difference between the original image signal components representing the two sampling points, which constitute each of the two sets of sampling points, and comparing the differences, which have been calculated for the two sets of sampling points, with each other.

3. A method as defined in claim 1, wherein said direction, along which the image edge portion extends, is specified by:

grouping each of two sets of sampling points, each set being constituted of two sampling points, which are located at two diagonal positions facing each other in the unit lattice, that contains the interpolation point therein, calculating the difference between the original image signal components representing the two sampling points, which constitute each of the two sets of sampling points, comparing the differences, which have been calculated for the two sets of sampling points, with each other, and carrying out an operation in accordance with the original image signal components representing the sampling points, which are located around the unit lattice, that contains the interpolation point therein.

4. A method as defined in claim 1 wherein said direction, along which the image edge portion extends, is specified by:

calculating an image density gradient vector with respect to each of the two array directions of the sampling points in the unit lattice, the calculation being made from the original image signal components representing four sampling points, which constitute the unit lattice, that contains the interpolation point therein, and making a judgment from the magnitude and the product of the two image density gradient vectors, which have been calculated with respect to the two array directions of the sampling points in the unit lattice.

5. A method as defined in claim 1 wherein said selection processes for selecting the original image signal components comprise:
   (i) a selection process, which is employed in cases where it has been specified that the image edge portion extends along an oblique direction with respect to the array directions of the sampling points in the unit lattice, the selection process comprising the steps of:
      dividing the unit lattice into two triangular regions with the image edge portion serving as the boundary therebetween,
      selecting a triangular region, which contains the interpolation point therein, from the two triangular regions, and
      selecting the original image signal components, which represent the three sampling points, that constitute the triangular region containing the interpolation point therein, and
   (ii) a selection process, which is employed in cases where it has been specified that the image edge portion extends along a direction parallel to one of the array directions of the sampling points in the unit lattice, the selection process comprising selecting the original image signal components, which represent the four sampling points, that constitute the unit lattice containing the interpolation point therein.

6. An interpolating operation method for an image signal, wherein an interpolated image signal component corresponding to an interpolation point is calculated from original image signal components of an original image signal representing an original image, which represent a plurality of sampling points arrived at predetermined intervals and in a lattice-like form, the method comprising the steps of:
   i) making a judgment as to whether the interpolation point belongs to an image edge portion, at which a change in the original image signal is sharp, or belongs to a flat portion, at which the change in the original image signal is unsharp, and
   ii) changing interpolating operation processes, one of which is to be employed for the interpolation point, over to each other in accordance with the results of the judgment; and
      wherein the interpolating operation process, which is employed in cases where, as result of said judgment, it has been judged that the interpolation point belongs to the image edge portion, is an interpolating operation process comprising the steps of:
         a) calculating each of interpolation coefficients, by which the corresponding one of the original image signal components is to be multiplied, from the original image signal components, which represent a plurality of the sampling points located in the vicinity of the interpolation point,
         b) calculating an image density gradient vector at the interpolation point on the original image, which is represented by the original image signal components,
         c) calculating the distance between a line segment, which intersects perpendicularly to said image density gradient vector, and each of the sampling points located in the vicinity of the interpolation point,
         d) correcting the interpolation coefficients such that the interpolation coefficient, by which the corresponding original image signal component is to be multiplied, may become small for a sampling point, for which said image density gradient vector and/or said distance is comparatively large, and
         e) multiplying the original image signal component by the corresponding corrected interpolation coefficient.

7. An interpolating operation method for an image signal, wherein an interpolated image signal component corresponding to al interpolation point is calculated from original image signal components of an original image signal representing an original image, which represent a plurality of sampling points arrayed at predetermined intervals and in a lattice-like form, the method comprising the steps of:
   i) making a judgment as to whether the inflation point belongs to an image edge portion, at which a change in the original image signal is sharp, or belongs to a flat portion, at which the change in the original image signal is unsharp, and
   ii) changing interpolating operation processes, one of which is to be employed for the interpolation point, over to each other in accordance with the results of the judgment; and wherein the interpolating operation process, which is employed in cases where, as a result of said judgment, it has been judged that the interpolation point belongs to a flat portion, is an interpolating operation process, with which the sharpness of the flat portion is rendered variable;
      wherein said interpolating operation process, with which the sharpness of the flat portion is rendered variable, is a spline interpolating operation process; and
      wherein said spline interpolating operation process is an interpolating operation process for obtaining an interpolated image signal component with Formula (1), $$Y_p = a_{k-1}Y_{k-1} + a_k Y_k + a_{k+1}Y_{k+1} + a_{k+2}Y_{k+2} \qquad (1)$$

in which $Y_{k-1}$, $Y_k$, $Y_{k+1}$, and $Y_{k+2}$ represent the original image signal components representing sampling points serving as picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients,
   the process comprising the steps of:
      a) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two piecer elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, a third-order spline interpolate function between the picture elements $X_k$ and $X_{k+1}$ is represented by $f_k$, a third-order spline interpolating function between the picture elements $X_{k-1}$ and $X_k$ is represented by $f_{k-1}$, and a third-order spline interpolating function between the picture elements $X_{k-1}$ and $X_{k+2}$ is represented by $f_{k+1}$:

① the spline interpolating function $f_k$ at the picture elements $X_k$ and $X_{k+1}$ satisfies the original image signal components $Y_k$ and $Y_{k+1}$, as represented by Formulas (2) and (3):

$$f_k(X_k) = Y_k \quad (2)$$

$$f_k(X_{k+1}) = Y_{k+1} \quad (3)$$

② the first-order differential coefficient of the spline interpolating function $f_k$ at the picture element $X_k$ coincides with the first-order differential coefficient of the spline interpolating function $f_{k-1}$ at the picture element $X_k$, as represented by Formula (4):

$$f_k'(X_k) = f_{k-1}'(X_k) \quad (4)$$

③ the first-order differential coefficient of the spline interpolating function $f_k$ at the picture element $X_{k+1}$ coincides with the fist-order differential coefficient of the spline interpolating function $f_{k+1}$ at the picture element $X_{k+1}$, as represented by Formula (5):

$$f_k'(X_{+1}) = f_{k+1}'(X_{k+1}) \quad (5)$$

④ the first-order differential coefficient of the spline interpolating function $f_k$ at the picture element $X_k$ has an inclination of an arbitrary parameter α with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (6), the arbitrary parameter α being selected previously and determining the sharpness of a secondary image represented by the interpolation image signal obtained from the interpolating operation, $$f_k'(X_k) = \alpha(Y_{k+1} - Y_{k-1})/(X_{k+1} = X_{k-1}) \quad (6)$$

and

⑤ the first-order differential coefficient of the spline interpolating function $f_k$ at the picture element $X_{k+1}$ has an inclination of said parameter α with respect to the gradient of the original image signal components $Y_k$ and $Y_{k+2}$ representing the picture elements $X_k$ and $X_{k+2}$, which are located before and after the picture element $X_{k+1}$, as represented by Formula (7):

$$f_k'(X_{k+1}) = \alpha(Y_{k+2} = Y_k)/(X_{k+2} = X_k) \quad (7)$$

and b) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

8. A method as defined in claim 7 wherein the calculated interpolation coefficients $a_{k-1}$, $a_k$, $a_{k+1}$, and $a_{k+2}$ are represented respectively by Formulas (8), (9), (10), and (11):

$$a_{k-1} = -(\alpha/2)t(t-1)^2 \quad (8)$$

$$a_k = (2-\alpha/2)t^3 - (3-\alpha 2)t^2 + 1 \quad (9)$$

$$a_{k+1} = (\alpha/2 - 2)t^3 + (3-\alpha)t^2 + (\alpha/2)t \quad (10)$$

$$a_{k+2} = (\alpha/2)t^2(t-1) \quad (11)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

9. An interpolating operation method for an image signal, wherein an interpolated image signal component corresponding to an interpolation point is calculated from original image signal components of an original image signal representing an original image, which represent a plurality of sampling points arrayed at predetermined intervals and in a lattice-like form, the method comprising the steps of:

i) making a judgment as to whether the interpolation point belongs to an image edge portion, at which a change in the original image signal is sharp, or belongs to a flat portion, at which the change in the original image signal is unsharp and ii) changing interpolating operation processes, one of which is to be employed for the interpolation point, over to each other in accordance with the results of the judgment; and wherein the interpolating operation process, which is employed in cases where, as a result of said judgment, it has been judged that the interpolation point belongs to a flat portion, is an interpolating operation process, with which the sharpness of the flat portion is rendered variable;

wherein said interpolating operation process, with which the sharpness of the flat portion is rendered variable, is a spline interpolating operation process; and wherein said spline interpolating operation process is an interpolating operation process for obtaining an interpolated image signal component with Formula (1), $$Y_p = a_{k-1}Y_{k-1} + a_k Y_k + a_{k+1}Y_{k+1} + a_{k+2}Y_{k+2} \quad (1)$$

in which $Y_{k-1}$, $Y_k$, $Y_{k+1}$, and $Y_{k+2}$ represent the original image signal components representing sampling points serving as picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k-1}$, and $a_{k-1}$, $a_k$, $a_{k+1}$, and $a_{k+2}$ represent the interpolation coefficients, the process comprising the steps of:

a) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$, and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, a third-order spline interpolating function between the picture elements $X_k$ and $X_{k+1}$ is represented by $f_k$, a third-order spline interpolating function between the picture elements $X_{k-1}$ and $X_k$ is represented by $f_{k-1}$, and a third-order spline interpolating function between the picture elements $X_{k+1}$ and $X_{k+2}$ is represented by $f_{k+1}$:

① the spline interpolating function $f_k$ at the picture elements $X_k$ and $X_{k+1}$ slightly deviates from the original image signal components $Y_k$ and $Y_{k+1}$ in accordance with an arbitrary parameter β, as represented by Formulas (12) and (13), the arbitrary parameter β being selected previously and determining the sharpness of a secondary image represented by the interpolation image signal obtained from the interpolating operation, $$f_k(X_k)=-0.5\beta Y_{k-1}+(1+\beta)Y_k-0.5\beta Y_{k+1} \quad (12)$$

$$f_k(X_{k+1})=-0.5\beta Y_k+(1+\beta)Y_{k+1}-0.5\beta Y_{k+2} \quad (13)$$

② the first-order differential coefficient of the spline interpolating function $f_k$ at the picture element $X_k$ coincides with the first-order differential coefficient of the spline interpolating function $f_{k-1}$ at the picture element $X_k$, as represented by Formula (4):

$$f_k'(X_k)=f_{k-1}'(X_k) \quad (4)$$

③ the first-order differential coefficient of the spline interpolating function $f_k$ at the picture element $X_{k+1}$ coincides with the fist-order differential coefficient of the spline interpolating function $f_{k+1}$ at the picture element $X_{k+1}$, as represented by Formula (5):

$$f_k'(X_{k+1})=f_{k+1}'(X_{k+1}) \quad (5)$$

④ the first-order differential coefficient of the spline interpolating function $f_k$ at the picture element $X_k$ coincides with the gradient of the original image signal components $Y_{k-1}$ and $Y_{k+1}$ representing the picture elements $X_{k-1}$ and $X_{k+1}$, which are located before and after the picture element $X_k$, as represented by Formula (14):

$$f_k'(X_k)=(Y_{k+1}-Y_{k-1})/(X_{k+1}-X_{k-1}) \quad (14)$$

and

⑤ the first-order differential coefficient of the spline interpolate function $f_k$ at the picture element $X_{k+1}$ coincides with the gradient of the original image signal components $Y_k$ and $Y_{k+2}$ representing the picture elements $X_k$ and $X_{k+2}$, which are located before and after the picture element $X_{k+1}$, as represented by Formula (15):

$$f_k'(X_{k+1})=(Y_{k+2}-Y_k)/(X_{k+2}-X_k) \quad (15)$$

and b) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

10. A method as defined in claim 9 wherein the calculated interpolation coefficients $a_{k-1}$, $a_k$, $a_{k+1}$, and $a_{k+2}$ are represented respectively by Formulas (16), (17), (18), and (19):

$$a_{k-1} = -(\beta+1/2)t^3 + (3\beta/2+1)t^2 - (1/2)t - \beta/2 \quad (16)$$

$$a_k = 3(\beta+1/2)t^3 - (9\beta/2+5/2)t^2 + \beta + 1 \quad (17)$$

$$a_{k+1} = -3(\beta+1/2)t^3 + (9\beta/2+2)t^2 + (1/2)t - \beta/2 \quad (18)$$

$$a_{k+2} = (\beta+1/2)t^3 - (3\beta/2+1/2)t^2 \quad (19)$$

in which t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

11. An interpolating operation method for an image signal, wherein an interpolated image signal component corresponding to an interpolation point is calculated from original image signal components of an original image sign representing an original image, which represent a plurality of sampling points arrayed at predetermined intervals and in a lattice-like form, the method comprising the steps of:

i) making a judgment as to whether the interpolation point belongs to an image edge portion, at which a change in the original image signal is sharp, or belongs to a flat portion, at which the change in the original image signal is unsharp, and ii) changing interpolating operation processes, one of which is to be employed for the interpolation point, over to each other in accordance with the results of the judgment; and wherein the interpolating operation process, which is employed in cases where, as a result of said judgment, it has been judged that the interpolation point belongs to a flat portion, is an interpolating operation process, with which the sharpness of the flat portion is rendered variable;

wherein said interpolating operation process, with which the sharpness of the flat portion is rendered variable, is a spline interpolating operation process; and wherein said spline interpolating operation process is an interpolating operations process for obtaining an interpolated image signal component with Formula (1), $$Y_p=a_{k-1}Y_{k-1}+a_kY_k+a_{k+1}Y_{k+1}+a_{k+2}Y_{k+2} \quad (1)$$

in which $Y_{k-1}$, $Y_k$, $Y_{k+1}$, and $Y_{k+2}$ represent the original image signal components representing sampling points serving as picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the process comprising the steps of:

a) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before tie interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, a third-order spline interpolating function between the picture elements $X_k$ and $X_{k+1}$ is represented by $f_k$, a third-order spline interpolating function between the picture elements $X_{k-1}$ and $X_k$ is represented by $f_{k-1}$, and a third-order spline interpolating function between the picture elements $X_{k+1}$ and $X_{k+2}$ is represented by $f_{k+1}$:

① the spline interpolating function $f_k$ at the picture elements $X_k$ and $X_{k+1}$ satisfies the original image signal components $Y_k$ and $Y_{k+1}$, as represented by Formulas (2) and (3):

$$f_k(X_k)=Y_k \quad (2)$$

$$f_k(X_{k+1})=Y_{k+1} \quad (3)$$

② the first-order differential coefficient of the spline interpolating function $f_k$ at the picture element $X_k$, coincides with the first-order differential coefficient of the spline interpolating function $f_{k-1}$ at the picture element $X_k$, as represented by Formula (4):

$$f_k'(X_k)=f_{k-1}'(X_k) \qquad (4)$$

③ the fist-order differential coefficient of the spline interpolating function $f_k$ at the picture element $X_{k+1}$ coincides with the fist-order differential coefficient of the spline interpolating function $f_{k+1}$ at the picture element $X_{k+1}$, as represented by Formula (5):

$$f_k'(X_{k+1})=f_{k+1}'(X_{k+1}) \qquad (5)$$

④ the first-order differential coefficient of the spline interpolating function $f_k$ at the picture element $X_k$ has an inclination of an arbitrary parameter α with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (6), the arbitrary parameter α being selected previously and determining the sharpness of a secondary image represented by the interpolation image signal obtained from the interpolating operation, $$f_k'(X_k)=\alpha(Y_{k+1}-Y_{k-1})/(X_{k+1}-X_{k-1}) \qquad (6)$$

and

⑤ the first-order differential coefficient of the spline interpolating function $f_k$ at the picture clement $X_{k+1}$ has an inclination of said parameter α with respect to the gradient of the original image signal components $Y_k$ and $Y_{k+2}$ representing the picture elements $X_k$ and $X_{k+2}$, which are located before and after the picture element $X_{k+1}$, as represented by Formula (7):

$$f_k'(X_{k+1})=\alpha(Y_{k+2}-Y_k)/(X_{k+2}-X_k) \qquad (7)$$

b) calculating interpolation coefficients $b_{k-1}$, $b_k$, $b_{k+1}$, and $b_{k+2}$ respectively corresponding to the original image signal components $Y_{k-1}$, $Y_k$, $Y_{k+1}$, and $Y_{k+2}$ such that:

⑥ the spline interpolating fiction $f_k$ at the picture elements $X_k$ and $X_{k+1}$ slightly deviates from the original image signal components $Y_k$ and $Y_{k+1}$ in accordance with an arbitrary parameter β, as represented by Formulas (12) and (13), the arbitrary parameter β being selected previously and determining the sharpness of a secondary image represented by the interpolation image signal obtained from the interpolating operation, $$f_k(X_k)=-0.5\beta Y_{k-1}+(1+\beta)Y_k-0.5\beta Y_{k+1} \qquad (12)$$

$$f_k(X_{k+1})=-0.5\beta Y_k+(1+\beta)Y_{k+1}-0.5\beta Y_{k+2} \qquad (13)$$

⑦ the first-order differential coefficient of the spline interpolating function $f_k$ at the picture element $X_k$ coincides with the first-order differential coefficient of the spline interpolating function $f_{k-1}$ at the picture element $X_k$, as represented by Formula (4):

$$f_k'(X_k)=f_{k-1}'(X_k) \qquad (4)$$

⑧ the first-order differential coefficient of the spline interpolating function $f_k$ at the picture element $X_{k+1}$ coincides with the first-order differential coefficient of the spline interpolating function $f_{k+1}$ at the picture element $X_{k+1}$, as represented by Formula (5):

$$f_k'(X_{k+1})=f_{k+1}'(X_{k+1}) \qquad (5)$$

⑨ the first-order differential coefficient of the spline interpolating function $f_k$ at the picture element $X_k$ coincides with the gradient of the original image signal components $Y_{k-1}$ and $Y_{k+1}$ representing the picture elements $X_{k-1}$ and $X_{k+1}$, which are located before and after the picture element $X_k$, as represented by Formula (14):

$$f_k'(X_k)=(Y_{k+1}-Y_{k-1})/(X_{k+1}-X_{k-1}) \qquad (14)$$

and

⑩ the first-order differential coefficient of the spline interpolating function $f_k$ at the picture element $X_{k+1}$ coincides with the gradient of the original image signal components $Y_k$ and $Y_{k+2}$ representing the picture elements $X_k$ and $X_{k+2}$, which are located before and after the picture element $X_{k-1}$, as represented by Formula (15):

$$f_k'(X_{k+1})=(Y_{k+2}-Y_k)/(X_{k+2}-X_k) \qquad (15)$$

c) calculating a mean value of the set of the interpolation coefficients $a_{k-1}$ and $b_{k-1}$, a mean value of the set of the interpolation coefficients $a_k$ and $b_k$, a mean value of the set of the interpolation coefficients $a_{k+1}$ and $b_{k+1}$, and a mean value of the set of the interpolation coefficients $a_{k+2}$ and $b_{k+2}$, which sets respectively correspond to the original image signal components $Y_{k-1}$, $Y_k$, $Y_{k+1}$, and $Y_{k+2}$, the calculated mean values being taken as the values of new interpolation coefficients $a_{k-1}$, $a_k$, $a_{k+1}$, and $a_{k+2}$, and d) calculating the interpolated image signal component $Y_p$ corresponding to the interpolation point $X_p$ in accordance with the calculated new interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

12. A method as defined in claim 11 wherein the calculated new interpolation coefficients $a_{k-1}$, $a_k$, $a_{k+1}$, and $a_{k+2}$, which represent the mean values, are represented respectively by Formulas (20), (21), (22), and (23):

$$a_{k-1} = -\{(\alpha+2\beta+1)/4\}t^3 + \{(2\alpha+3\beta+2)/4\}t^2 - \{(\alpha+1)/4\}t - \beta/4 \qquad (20)$$

$$a_k = \{(-\alpha+6\beta+7)/4\}t^3 + \{(\alpha-9\beta-11)/4\}t^2 + \beta/2 + 1 \qquad (21)$$

$$a_{k+1} = \{(\alpha-6\beta-7)/4\}t^3 + \{(-2\alpha+9\beta+10)/4\}t^2 + \{(\alpha+1)/4\}t - \beta/4 \qquad (22)$$

$$a_{k+2} = \{(\alpha+2\beta+1)/4\}t^3 - \{(\alpha+3\beta+1)/4\}t^2 \qquad (23)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

13. An interpolating operation method for an image signal, wherein an interpolated image signal component corresponding to an interpolation point is calculated from original image signal components of an original image signal representing an original image, which represent a plurality of sampling points arrayed at predetermined intervals and in a lattice-like form, the method comprising the steps of:

i) making a judgment as to whether the interpolation point belongs to an image edge portion, at which a change in the original image signal is sharp, or belongs to a flat portion, at which the change in the original image signal is unsharp, and ii) changing interpolating operation processes, one of which is to be employed for the interpolation point, over to each other in accordance with the results of the judgment; and wherein the interpolating operation process, which is employed in cases where, as a result of said judgment, it has been judged that the interpolation point belongs to a flat portion, is an interpolating operation process, with which the sharpness of the flat portion is rendered variable; and wherein said interpolating operation process, with which the sharpness of the flat portion is rendered variable, is an interpolating operation process, comprising the steps of:

linearly combining interpolation coefficients Bij and Cij, which correspond to each other and are set for each of the original image signal components Yij, in two different interpolating functions f and g for obtaining two interpolation images having different levels of sharpness, which functions are represented by Formulas (24) and (25), said linear combination being carried out with Formula (26) by use of a variable factor α, where a is set to be one of all real numbers, a new interpolation coefficient Aij being obtained from said linear combination, and carrying out an interpolating operation on the original image signal components Yij by using an interpolating function h having the new interpolation coefficient Aij, which function is represented by Formula (27):

$$f = \Sigma Bij \cdot Yij \quad (24)$$

$$g = \Sigma Cij \cdot Yij \quad (25)$$

$$Aij = (1-\alpha)Bij + \alpha Cij \quad (26)$$

$$h = \Sigma Aij \cdot Yij \quad (27)$$

in which i=1, 2, ..., j=1, 2, ..., and α represents one of all real numbers.

14. A method as defined in claim 13 wherein one of said two different interpolating functions f and g for obtaining two interpolation images having different levels of sharpness is a cubic spline interpolating operation function, and the other is a B spline interpolating operation function.

15. An interpolating operation apparatus for an image signal, wherein an interpolated image signal component corresponding to an interpolation point is calculated from original image signal components of an original image signal representing an original image, which represent a plurality of sampling points arrived at predetermined intervals and in a lattice-like form, the apparatus comprising:

i) an edge presence or absence judging means for making a judgment as to whether the interpolation point belongs to an image edge portion, at which the change in the original image signal is sharp, or belongs to a flat portion, at which the change in the original image signal is unsharp, ii) a first interpolating operation means for calculating an interpolated image signal component corresponding to an interpolation point, which belongs to the image edge portion, wherein said first interpolating operation means comprises:

a) an edge extending direction specifying means for specifying the direction, along which the image edge portion extends, with respect to the array directions of the sampling points in a unit lattice, b) a first operation means comprising:

a region dividing means for dividing the unit lattice into two triangular regions with the image edge portion serving as the boundary therebetween, said image edge portion extending along an oblique direction with respect to the array directions of the sampling points in the unit lattice, a region selecting means for selecting a triangular region, which contains the interpolation point therein, from the two triangular regions, and an operation means for calculating the interpolated image signal component corresponding to the interpolation point, the calculation being made from the original image signal components, which represent the three sampling points, that constitute the triangular region containing the interpolation point therein, c) a second operation means for calculating the interpolated image signal component corresponding to the interpolation point, the calculation being made from the original image signal components, which represent the four sampling points, that constitute the unit lattice containing the interpolation point therein, and d) an operation selecting means for:

selecting said first operation means in cases where, as a result of said specifying carried out by said edge extending direction specifying carried out by said edge extending direction specifying means, it has been specified that the image edge portion extends along an oblique direction with respect to the array directions of the sampling points in the unit lattice, and selecting said second operation means in cases, where as a result of said specifying carried out by said edge extending direction specifying means, it has been specified that the image edge portion extends along a direction parallel to one of the array directions of the sampling points in the unit lattice;

iii) a second interpolating operation means for calculating an interpolated image signal component corresponding to an interpolation point, which belongs to the flat portion, and iv) an operation chance-over means for changing said first interpolating operation means and said second interpolating operation means over to each other, such that said first interpolating operation means may be utilized in cases where, as a result of said judgment made by said edge presence or absence judging means, it has been judged that the interpolation point belongs to the image edge portion, and such that said second interpolating operation means may be utilized in cases where, as a result of said judgment made by said edge presence or absence judging means, it has been judged that the interpolation point belongs to the flat portion.

16. An apparatus as defined in claim 15 wherein said edge extending direction specifying means specifies said direction, along which the image edge portion extends , by:

grouping each of two sets of sampling points, each set being constituted of two sampling points, which are located at two diagonal positions facing each other in the unit lattice, that contains the interpolation point therein, calculating the difference between the original image signal components representing the two sampling points, which constitute each of the two sets of sampling points, and comparing the differences, which have been calculated for the two sets of sampling points, with each other.

17. An apparatus as defined in claim 15 wherein said edge extending direction specifying means specifies said direction, along which the image edge portion extends, by:

grouping each of two sets of sampling points, each set being constituted of two sampling points, which are located at two diagonal positions facing each other in the unit lattice, that contains the interpolation point therein, calculating the difference between the original image signal components representing the two sampling points, which constitute each of the two sets of sampling points, comparing the differences, which have been calculated for the two sets of sampling points, with each other, and carrying out an operation in accordance with the original image signal components representing the sampling points, which are located around the unit lattice, that contains the interpolation point therein.

18. An apparatus as defined in claim 15 wherein said edge extending direction specifying means specifies said direction, along which the image edge portion extends, by:

calculating an image density gradient vector with respect to each of the two array directions of the sampling points in the unit lattice, the calculation being made from the original image signal components representing four sampling points, which constitute the unit lattice, that contains the interpolation point therein, and making a judgment from the magnitude and the product of the two image density gradient vectors, which have been calculated with respect to the two array directions of the sampling points in the unit lattice.

19. An interpolating operation apparatus for an image signal, wherein an interpolated image signal component corresponding to an interpolation point is calculated from original image signal components of an original image signal representing an original image, which represent a plurality of sampling points arrived at predetermined intervals and in a lattice-like form, the apparatus comprising:

i) an edge presence or absence judging means for making a judgment as to whether the interpolation point belongs to an image edge portion, at which the change in the original image signal is sharp, or belongs to a flat portion, at which the change in the original image signal is unsharp, ii) a first interpolating operation means for calculating an interpolated image signal component corresponding to an interpolation point, which belongs to the image edge portion, iii) a second interpolating operation means for calculating an interpolated image signal component corresponding to an interpolation point, which belongs to the flat portion, and iv) an operation change-over means for changing said first interpolating operation means and said second interpolating operation means over to each other, such that said first interpolating operation means may be utilized in cases where, as a result of said judgment made by said edge presence or absence judging means, it has been judged that the interpolation point belongs to the image edge portion, and such that said second interpolating operation means may be utilized in cases where, as a result of said judgment made by said edge presence or absence judging means, it has been judged that the interpolation point belongs to the flat portion; and wherein said first interpolating operation means comprises:

a) an interpolation coefficient calculating means for calculating each of interpolation coefficients, by which the corresponding one of the original image signal components is to be multiplied, from the original image signal components, which represent a plurality of the sampling points located in the vicinity of the interpolation point, b) an image density gradient vector calculating means for calculating an image density gradient vector at the interpolation point on the original image, which is represented by the original image signal components, c) a distance calculating means for calculating the distance between a line segment, which intersects perpendicularly to said image density gradient vector, and each of the sampling points located in the vicinity of the interpolation point, d) a correction means for correcting the interpolation coefficients such that the interpolation coefficient, by which the corresponding original image signal component is to be multiplied, may become small for a sampling point, for which said image density gradient vector and/or said distance is comparatively large, and e) an operation processing means for multiplying the original image signal component by the corresponding interpolation coefficient, which has been corrected by said correction means.

20. An interpolating operation apparatus for an image signal, wherein an interpolated image signal component corresponding to an interpolation point is calculated from original image signal components of an original image signal representing an original image, which represent a plurality of sampling points arrayed at predetermined intervals and in a lattice-like form, the apparatus comprising:

i) an edge presence or absence judging means for making a judgment as to whether the interpolation point belongs to an image edge portion, at which the change in the original image signal is sharp or belongs to a flat portion, at which the change in the original image signal is unsharp, ii) a first interpolating operation means for calculating an interpolated image signal component corresponding to an interpolation point, which belongs to the image edge portion, iii) a second interpolating operation means for calculating an interpolated image signal component corresponding to an interpolation point, which belongs to the flat portion, and iv) an operation change-over means for changing said first interpolating operation means and said second interpolating operation means over to each other, such that said first interpolating operation means may be utilized in cases where, as a result of said judgment made by said edge presence or absence judging means, it has been judged that the interpolation point belongs to the image edge portion, and such that said second interpolating operation means may be utilized in cases where, as a result of said judgment made by said edge presence or absence judging means, it has been judged that the interpolation point belongs to the flat portion; and wherein said second interpolating operation means comprises:
an input means for inputting an instruction concerning the alteration of sharpness of the flat portion from the exterior, and
an interpolating operation means, with which the sharpness of the flat portion is capable of being altered in accordance with the instruction inputted from said input means.

21. An apparatus as defined in claim 20 wherein said interpolating operation means, with which the sharpness of the flat portion is capable of being altered, is a spline interpolating operation means.

22. An apparatus as defined in claim 21 wherein said spline interpolating operation means is an interpolating operation means for obtaining an interpolated image signal component with Formula (1), $$Y_p = a_{k-1}Y_{k-1} + a_k Y_k + a_{k+1}Y_{k+1} + a_{k+2}Y_{k+2} \tag{1}$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the spline interpolating operation means comprising:
1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (8), (9), (10), and (11):

$$a_{k-1} = -(\alpha/2)t(t-1)^2 \tag{8}$$

$$a_k = (2\alpha/2)t^3 - (3-\alpha/2)t^2 + 1 \tag{9}$$

$$a_{k+1} = (\alpha/2 - 2)t^3 + (3-\alpha)t^2 + (\alpha/2)t \tag{10}$$

$$a_{k+2} = (\alpha/2)t^2(t-1) \tag{11}$$

in which α represents the parameter determining the sharpness of a secondary image represented by the interpolation image signal obtained from the interpolating operation, and t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter α, which determines the sharpness of the secondary image reproduced from the interpolation image signal obtained from the interpolating operation, 3) an interpolation coefficient operation means for calculating the interpolation coefficients $a_{k-1}$, $a_k$, $a_{k+1}$, and $a_{k+2}$ in accordance with the parameter α, the calculation being carried out from the interpolation coefficients, which are stored in said storage means, and the parameter α inputted from said input means, and 4) an inter plating operation means for storing Formula (1) as the operation formula, and calculating the value of the interpolated image signal component $Y_p$, which corresponds to the interpolation point $X_p$, with Formula (1) in accordance with the interpolation coefficients $a_{k-1}$, $a_k$, $a_{k+1}$, and $a_{k+2}$, which have been calculated by said interpolation coefficient operation means, and the original image signal components $Y_{k-1}$, $Y_k$, $Y_{k+1}$, and $Y_{k+2}$.

23. An apparatus as defined in claim 21 wherein said spline interpolating operation means is an interpolating operation means for obtaining an interpolated image signal component with Formula (1), $$Y_p = a_{k-1}Y_{k-1} + a_k Y_k + a_{k+1}Y_{k+1} + a_{k+2}Y_{k+2} \tag{1}$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the spline interpolating operation means comprising:
1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (16), (17), (18), and (19):

$$a_{k-1} = -(\beta + 1/2)t^3 + (3\beta/2 + 1)t^2 - (1/2)t - \beta/2 \tag{16}$$

$$a_k = 3(\beta + 1/2)t^3 - (9\beta/2 + 5/2)t^2 + \beta + 1 \tag{17}$$

$$a_{k+1} = -3(\beta + 1/2)t^3 + (9\beta/2 + 2)t^2 + (1/2)t - \beta/2 \tag{18}$$

$$a_{k+2} = (\beta + 1/2)t^3 - (3\beta/2 + 1/2)t^2 \tag{19}$$

in which β represents the parameter determining the sharpness of a secondary image represented by the interpolation image signal obtained from the interpolating operation, and t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter β, which determines the sharpness of the secondary image reproduced from the interpolation image signal obtained from the interpolating operation, 3) an interpolation coefficient operation means for calculating the interpolation coefficients $a_{k-1}$, $a_k$, $a_{k+1}$, and $a_{k+2}$ in accordance with the parameter β, the calculation being carried out from the interpolation coefficients, which are stored in said storage means, and the parameter β inputted from said input means, and 4) an interpolating operation means for storing Formula (1) as the operation formula, and calculating the value of the interpolated image signal component $Y_p$, which corresponds to the interpolation point $X_p$, with Formula (1) in accordance with the interpolation coefficients $a_{k-1}$, $a_k$, $a_{k+1}$, and $a_{k+2}$, which have been calculated by said interpolation coefficient operation means, and the original image signal components $Y_{k-1}$, $Y_k$, $Y_{k+1}$, and $Y_{k+2}$.

24. An apparatus as defined in claim 21 wherein said spline interpolating operation means is an interpolating operation means for obtaining an interpolated image signal component with Formula (1), $$Y_p = a_{k-1}Y_{-1} + a_kY_k + a_{k+1}Y_{k+1} + a_{k+2}Y_{k+2} \quad (1)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the spline interpolating operation means comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (20), (21), (22), and (23):

$$a_{k-1} = -\{(\alpha + 2\beta + 1)/4\}t^3 + \{(2\alpha + 3\beta + 2)/4\}t^2 - \{(\alpha + 1)/4\}t - \beta/4 \quad (20)$$

$$a_k = \{(-\alpha + 6\beta + 7)/4\}t^3 + \{(\alpha - 9\beta - 11)/4\}t^2 + \beta/2 + 1 \quad (21)$$

$$a_{k+1} = \{(\alpha - 6\beta - 7)/4\}t^3 + \{(-2\alpha + 9\beta + 10)/4\}t^2 + \{(\alpha + 1)/4\}t - \beta/4 \quad (22)$$

$$a_{k+2} = \{(\alpha + 2\beta + 1)/4\}t^3 - \{(\alpha + 3\beta + 1)/4\}t^2 \quad (23)$$

in which $\alpha$ and $\beta$ represent the parameters determining the sharpness of a secondary image represented by the interpolation image signal obtained from the interpolating operation, and t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameters $\alpha$ and $\beta$, which determine the sharpness of the secondary image reproduced from the interpolation image signal obtained from the interpolating operation, 3) an interpolation coefficient operation means for calculating the interpolation coefficients $a_{k-1}$, $a_k$, $a_{k+1}$, and $a_{k+2}$ in accordance with the parameters $\alpha$ and $\beta$, the calculation being carried out from the interpolation coefficients, which are stored in said storage means, and the parameters $\alpha$ and $\beta$ inputted from said input means, and 4) an interpolating operation means for storing Formula (1) as the operation formula, and calculating the value of the interpolated image signal component $Y_p$, which corresponds to the interpolation point $X_p$, with Formula (1) in accordance with the interpolation coefficients $a_{k-1}$, $a_k$, $a_{k+1}$, and $a_{k+2}$, which have been calculated by said interpolation coefficient operation means, and the original image signal components $Y_{k-1}$, $Y_k$, $Y_{k+1}$, and $Y_{k+2}$.

25. An apparatus as defined in claim 20 wherein said interpolating operation means, with which the sharpness of the flat portion is capable of being altered, is an interpolating operation means for:

linearly combining interpolation coefficients Bij and Cij, which correspond to each other and are set for each of the original image signal components Yij, in two different interpolating functions f and g for obtaining two interpolation images having different levels of sharpness, which functions are represented by Formulas (24) and (25), said linear combination being carried out with Formula (26), a new interpolation coefficient Aij being obtained from said linear combination, and carrying out an interpolating operation on the original image signal components Yij by using an interpolating function h having the new interpolation coefficient Aij, which function is represented by Formula (27), an interpolation image signal being obtained from said interpolating operation, said interpolation image signal being made up of a series of image signal components, which occur at intervals different from those of the original image signal components Yij:

$$f = \Sigma Bij \cdot Yij \quad (24)$$

$$g = \Sigma Cij \cdot Yij \quad (25)$$

$$Aij = (1-\alpha)Bij + \alpha Cij \quad (26)$$

$$h = \Sigma Aij \cdot Yij \quad (27)$$

in which $i = 1, 2, \ldots$, $j = 1, 2, \ldots$, and $\alpha$ represents one of all real numbers.

26. An apparatus as defined in claim 25 wherein one of said two different interpolating functions f and g for obtaining two interpolation images having different levels of sharpness is a cubic spline interpolating operation function, and the other is a B spline interpolating operation function.

* * * * *